US012716193B2

(12) United States Patent
Fukuda et al.

(10) Patent No.: US 12,716,193 B2
(45) Date of Patent: Aug. 25, 2026

(54) WORKING VEHICLE AND ATTACHMENT USAGE SYSTEM

(71) Applicant: Kubota Corporation, Osaka (JP)

(72) Inventors: Yuji Fukuda, Sakai (JP); Tomoyuki Noguchi, Sakai (JP); Ryuki Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 202 days.

(21) Appl. No.: 18/783,746

(22) Filed: Jul. 25, 2024

(65) Prior Publication Data

US 2026/0028795 A1 Jan. 29, 2026

(51) Int. Cl.

| | |
|---|---|
| ***E02F 3/96*** | (2006.01) |
| ***E02F 9/26*** | (2006.01) |
| *E02F 3/36* | (2006.01) |
| *E02F 9/22* | (2006.01) |
| *H04L 67/12* | (2022.01) |

(52) U.S. Cl.

CPC .................. *E02F 3/96* (2013.01); *E02F 9/26* (2013.01); *E02F 3/3631* (2013.01); *E02F 3/3663* (2013.01); *E02F 9/2228* (2013.01); *E02F 9/2285* (2013.01); *E02F 9/2292* (2013.01); *E02F 9/2296* (2013.01); *H04L 67/12* (2013.01)

(58) Field of Classification Search

CPC ... E02F 3/96; E02F 9/26; E02F 3/3631; E02F 3/3663; E02F 9/2228; E02F 9/2285; E02F 9/2292; E02F 9/2296; H04L 67/12

See application file for complete search history.

(56) References Cited

U.S. PATENT DOCUMENTS

| | | | | |
|---|---|---|---|---|
| 2013/0274925 | A1* | 10/2013 | Oates, Jr. | E02F 9/267 700/275 |
| 2016/0017574 | A1* | 1/2016 | Adachi | E02F 9/2054 701/31.4 |
| 2019/0112792 | A1* | 4/2019 | Reed | E02F 3/437 |
| 2019/0376260 | A1* | 12/2019 | Sherlock | E02F 3/435 |
| 2020/0181876 | A1* | 6/2020 | Mahrenholz | E02F 3/43 |
| 2022/0412040 | A1 | 12/2022 | Zitterbart et al. | |
| 2023/0063720 | A1* | 3/2023 | Ueno | G06Q 10/103 |
| 2023/0340755 | A1* | 10/2023 | Steinlage | E02F 3/907 |
| 2024/0117608 | A1* | 4/2024 | Shobe | E02F 9/265 |

* cited by examiner

*Primary Examiner* — Hussein Elchanti

(74) *Attorney, Agent, or Firm* — Keating & Bennett, LLP

(57) ABSTRACT

A working vehicle includes a linkage, a receiver to receive wireless signal(s) from transmitter(s) in/on the attachment(s) and including identification information of the attachment(s), and a controller configured/programmed to select identification information of the attachment attached to the linkage from the identification information included in the received wireless signal(s), and start a process based on the selected identification information. The controller is configured/programmed to cause a memory and/or storage to store, for a first period of time, the identification information included in the received wireless signal(s), and when the attachment is attached to the linkage, perform a first selecting process to select identification information satisfying a first condition from the stored identification information, and, if no identification information satisfying the first condition is stored, perform a second selecting process to select identification information satisfying a second condition from identification information included in wireless signal(s) received after the attachment is attached.

27 Claims, 17 Drawing Sheets

Fig.3

| Attachment ID | Display data |
|---|---|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.4

| Attachment ID | Control data<br>Amount of supply of hydraulic fluid |
|---|---|
| ATT0001 | None |
| ATT0002 | Small |
| ATT0003 | Large |
| ⋮ | ⋮ |

| Name | Attachment ID | Specifications |
| --- | --- | --- |
| Bucket | ATT0001 | Excavation, Large, Total length, Total width, etc. |
| Spreader | ATT0002 | Spreading, Total length, Total width, etc. |
| Skid cutter | ATT0003 | Mowing, Small, Total length, Total width, etc. |
| Pallet fork | ATT00xy | Cargo handling, Total length, Total width, etc. |
| Bucket | ATT00xx | Excavation, Small, Total length, Total width, etc. |
| | . . . | . . . |

<Attachment information collecting process>

<Attachment information collecting process>

WORKING VEHICLE AND ATTACHMENT USAGE SYSTEM

BACKGROUND OF THE INVENTION

1. Field of the Invention

The present invention relates to techniques to use attachments on working vehicles.

2. Description of the Related Art

For example, the specification of U.S. Patent Application Publication No. 2022/412040 discloses a system to automatically determine the positions of attachments in the vicinity of a working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit and/or the received signal strength of the first acceleration signal, and transmits the identification information of the attachment to the controller. The controller performs an appropriate operation (work operation) of the working vehicle based on the received identifying signal.

However, with the known systems as described above, the identification module determines the position of an attachment corresponding to a first acceleration signal every time the first acceleration signal from the first communication unit is received by the second communication unit, regardless of whether the attachment is attached to the working vehicle or not. Therefore, the processing load on the identification module increases needlessly, causing inefficiency.

SUMMARY OF THE INVENTION

One or more example embodiments of the present invention make it possible to efficiently use attachments on working vehicles.

A working vehicle according to an example embodiment of the present invention includes a linkage to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select a piece of identification information of the attachment attached to the linkage from the one or more pieces of identification information included in the one or more wireless signals received by the receiver, and start a predetermined process based on the selected piece of identification information, wherein the controller is configured or programmed to cause a memory and/or storage to store, for a first predetermined period of time, the one or more pieces of identification information included in the one or more wireless signals received by the receiver, and when the attachment is attached to the linkage, perform a first selecting process to select a piece of identification information satisfying a first condition from the one or more pieces of identification information stored in the memory and/or storage, and, if the memory and/or storage stores no identification information satisfying the first condition, perform a second selecting process to select a piece of identification information satisfying a second condition from one or more pieces of identification information included in one or more wireless signals received by the receiver after the attachment is attached to the linkage.

The controller may be configured or programmed to, in the second selecting process, if the receiver receives a wireless signal including a piece of identification information satisfying the second condition, select the piece of identification information included in the wireless signal.

The controller may be configured or programmed to cause the memory and/or storage to store, for the first predetermined period of time, one or more received signal strengths of the one or more wireless signals received by the receiver such that the one or more received signal strengths are associated with the one or more pieces of identification information included in the one or more wireless signals, and, in the first selecting process, select, from the one or more pieces of identification information stored in the memory and/or storage, a piece of identification information which satisfies the first condition and which is included in a wireless signal with a highest received signal strength.

The first condition and the second condition may differ from each other in a degree of a selection criterion based on which a piece of identification information is selected.

The second condition may be stricter than the first condition in the degree of the selection criterion based on which a piece of identification information is selected.

The first condition and the second condition may each include a condition in which the piece of identification information to be selected by the controller is a piece of identification information included in a wireless signal with a received signal strength greater than a predetermined value.

The second condition may include a condition in which the piece of identification information to be selected by the controller is a piece of identification information included in a wireless signal with a received signal strength greater compared to the first condition.

The working vehicle may further include a machine body to support the linkage, and a traveling device to support the machine body such that the machine body is allowed to travel.

At least the second condition of the first and second conditions may include a condition in which the piece of identification information to be selected by the controller is a piece of identification information corresponding to a wireless signal which includes vibration information indicating that a corresponding attachment is vibrating.

The controller may be configured or programmed to, based on the vibration information, acquire a value-for-determination indicating at least one of a vibration strength of the corresponding attachment, a frequency of vibration occurrence of the corresponding attachment, or a vibration duration of the corresponding attachment. The second condition may include a condition in which the piece of identification information to be selected by the controller is a piece of identification information included in a wireless signal with a value-for-determination greater compared to the first condition.

The working vehicle may further include a machine body to support the linkage, and a driver on the machine body to be driven. The driver may include at least one of a position changer to connect the linkage and the machine body and to be driven to change a position of the linkage relative to the machine body, or a traveling device to support the machine body and to be driven to impart a propelling force to the machine body.

The controller may be configured or programmed to, in the second selecting process, select a piece of identification information satisfying the second condition from one or more pieces of identification information included in one or more wireless signals received by the receiver after the attachment is attached to the linkage and after the driver starts to be driven.

The controller may be configured or programmed to, in the second selecting process, select a piece of identification information satisfying the second condition from one or more pieces of identification information included in one or more wireless signals received by the receiver during a second predetermined period of time after the attachment is attached to the linkage and after the driver starts to be driven.

The working vehicle may further include a machine body to support the linkage, and a vibration detector provided in or on the machine body to detect vibration of the machine body. At least the second condition of the first and second conditions may include a condition in which the piece of identification information to be selected by the controller is a piece of identification information corresponding to a wireless signal including vibration information indicating that there is vibration on a corresponding attachment, the vibration on the corresponding attachment relatively matching the vibration of the machine body detected by the vibration detector.

The controller may be configured or programmed to end the second selecting process if, in the second selecting process, the second condition is satisfied by none of one or more pieces of identification information included in one or more wireless signals received by the receiver during a third predetermined period of time starting when the attachment is attached to the linkage, and allow a user interface to receive input of information indicating the attachment attached to the linkage, and start the predetermined process based on the information received via the user interface.

The third predetermined period of time may differ in duration from the first predetermined period of time.

The working vehicle may further include a machine body to support the linkage, a position detector to detect a position of the machine body and/or the linkage, and an input to receive input of a plurality of positions of a plurality of the attachments. The first condition and the second condition may each include a condition in which the piece of identification information to be selected by the controller is a piece of identification information corresponding to a certain attachment, a distance-for-determination between the position detected by the position detector and a position of the certain attachment received via the input being less than or equal to a predetermined distance.

The predetermined distance based on which the piece of identification information is to be selected by the controller may be smaller in the second condition than in the first condition.

The linkage may include a hitch selectively operable in a first mode in which the attachment is allowed to be attached and detached or a second mode in which the attachment is restricted from being attached and detached. The controller may be configured or programmed to perform the first selecting process or the second selecting process when the hitch is switched from the first mode to the second mode to attach the attachment thereto.

The working vehicle may further include an operation actuator to be operated to switch the hitch between the first mode and the second mode. The controller may be configured or programmed to determine whether the hitch has been switched from the first mode to the second mode and the attachment is attached to the hitch based on an operation state of the operation actuator, and perform the first selecting process or the second selecting process.

The controller may be configured or programmed to, when the hitch is switched from the first mode to the second mode to attach the attachment thereto, determine whether the memory and/or storage stores any piece of identification information satisfying the first condition, and perform the first selecting process if the memory and/or storage stores one or more pieces of identification information satisfying the first condition, and perform the second selecting process instead of the first selecting process if the memory and/or storage stores no identification information satisfying the first condition.

An attachment usage system according to an example embodiment of the present invention includes a linkage provided on a working vehicle to attach and detach an attachment thereto and therefrom, one or more transmitters provided in or on one or more of the attachments to periodically transmit one or more wireless signals which include respective one or more pieces of identification information of the one or more attachments and which are compliant with a near field communication standard, a receiver provided on the working vehicle to receive the one or more wireless signals transmitted from the one or more transmitters, and a controller configured or programmed to select a piece of identification information of the attachment attached to the linkage from the one or more pieces of identification information included in the one or more wireless signals received by the receiver, and start a predetermined process based on the selected piece of identification information, wherein the controller is configured or programmed to cause a memory and/or storage to store, for a first predetermined period of time, the one or more pieces of identification information included in the one or more wireless signals received by the receiver, and when the attachment is attached to the linkage, perform a first selecting process to select a piece of identification information satisfying a first condition from the one or more pieces of identification information stored in the memory and/or storage, and, if the memory and/or storage stores no identification information satisfying the first condition, perform a second selecting process to select a piece of identification information satisfying a second condition from one or more pieces of identification information included in one or more wireless signals received by the receiver after the attachment is attached to the linkage.

A working vehicle according to an example embodiment of the present invention includes a linkage to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select a piece of identification information of the attachment attached to the linkage from the one or more pieces of identification information included in the one or more wireless signals received by the receiver, and start a predetermined process based on the selected piece of identification information, wherein the controller is configured or programmed to, when the attachment is attached to the linkage, perform a first selecting process to select a piece of identification information satisfying a first condition from one or more pieces of identification information included in one or more wireless signals received by the receiver during a first predetermined period of time which ends when the attachment is attached to the linkage, and if there is no identification information satisfying the first condition, perform a second selecting process to select a piece of identification information satisfying a second condition from one or more pieces of identification information included in one or more wireless signals received by the receiver after the attachment is attached to the linkage, and the first condition and the second condition differ from each other in a degree of a selection criterion based on which a piece of identification information is selected.

The second condition may be stricter than the first condition in the degree of the selection criterion based on which a piece of identification information is selected.

The first condition and the second condition may each include a condition in which the piece of identification information to be selected by the controller is a piece of identification information included in a wireless signal with a received signal strength greater than a predetermined value.

The second condition may include a condition in which the piece of identification information to be selected by the controller is a piece of identification information included in a wireless signal with a received signal strength greater compared to the first condition.

An attachment usage system according to an example embodiment of the present invention includes a linkage provided on a working vehicle to attach and detach an attachment thereto and therefrom, one or more transmitters provided in or on one or more of the attachments to periodically transmit one or more wireless signals which include respective one or more pieces of identification information of the one or more attachments and which are compliant with a near field communication standard, a receiver provided on the working vehicle to receive the one or more wireless signals transmitted from the one or more transmitters, and a controller configured or programmed to select a piece of identification information of the attachment attached to the linkage from the one or more pieces of identification information included in the one or more wireless signals received by the receiver, and start a predetermined process based on the selected piece of identification information, wherein the controller is configured or programmed to, when the attachment is attached to the linkage, perform a first selecting process to select a piece of identification information satisfying a first condition from one or more pieces of identification information included in one or more wireless signals received by the receiver during a first predetermined period of time which ends when the attachment is attached to the linkage, and if there is no identification information satisfying the first condition, perform a second selecting process to select a piece of identification information satisfying a second condition from one or more pieces of identification information included in one or more wireless signals received by the receiver after the attachment is attached to the linkage, and the first condition and the second condition differ from each other in a degree of a selection criterion based on which a piece of identification information is selected.

The above and other elements, features, steps, characteristics and advantages of the present invention will become more apparent from the following detailed description of example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 3 is a diagram showing an example of the relationship between attachment IDs and their corresponding pieces of display data.

FIG. 4 is a diagram showing an example of the relationship between attachment IDs and their corresponding pieces of control data.

FIG. 5 is a screen showing an example of an attachment list.

DETAILED DESCRIPTION OF THE EXAMPLE EMBODIMENTS

Figure 1:
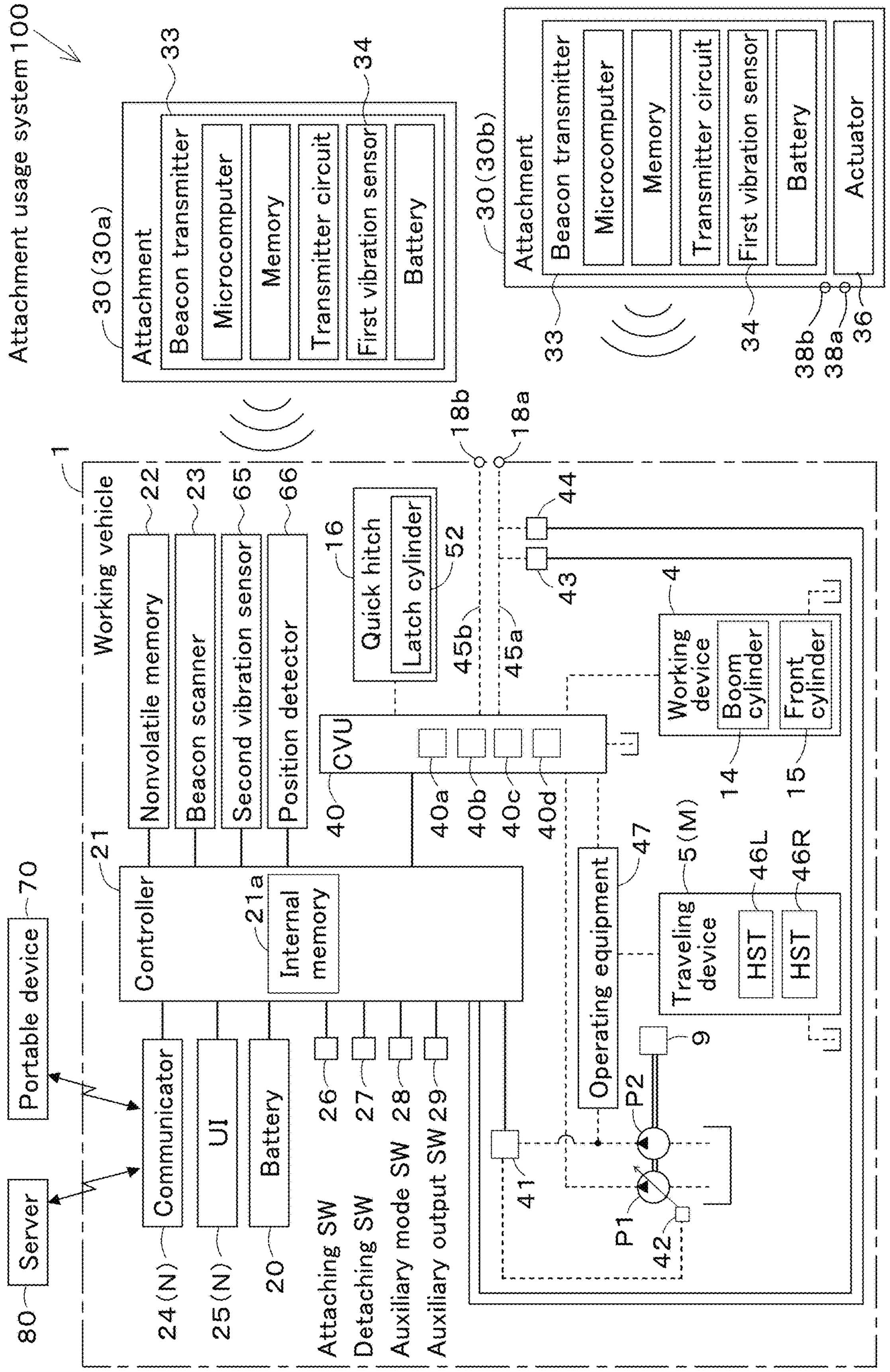
FIG. 1 is a block diagram of an attachment usage system and a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings as needed.

Figure 14:
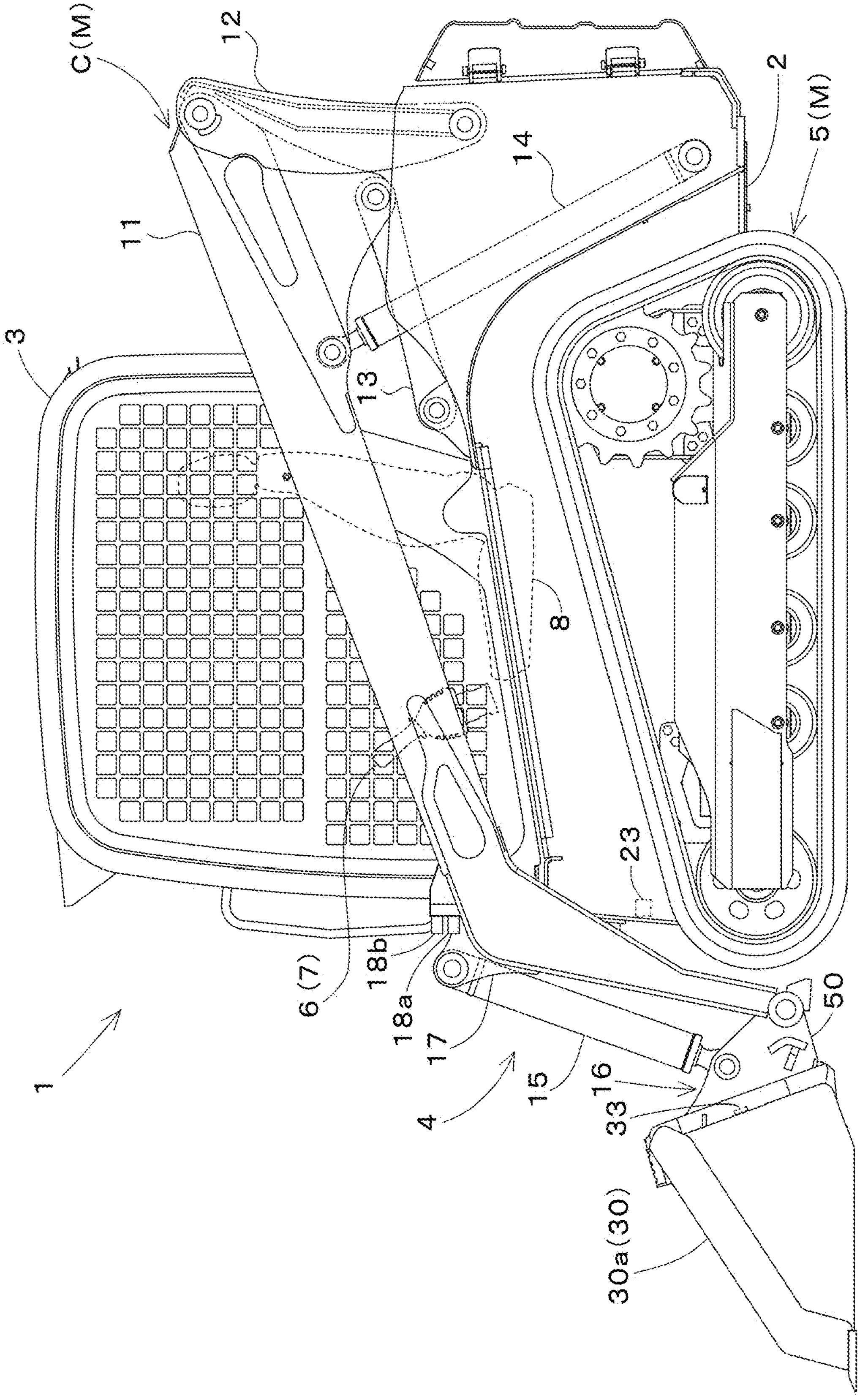
FIG. 14 is a side view of a working vehicle.

FIG. 14 is a side view of a working vehicle 1 according to the present example embodiment. In the present example embodiment, a compact track loader is discussed as an example of the working vehicle 1. Note, however, that the working vehicle according to a example embodiment of the present invention is not limited to a compact track loader, and may be, for example, some other construction machine or agricultural machine such as a skid-steer loader, a backhoe, or a tractor.

The working vehicle 1 includes a machine body 2, a cabin 3, a working device 4, and traveling device(s) 5. The cabin 3 is provided on the machine body 2. The machine body 2 supports instruments and devices included in the working vehicle 1. The cabin 3 includes a user's seat 8, manual operators (manual operators) to be operated by a user seated on the user's seat 8, and/or the like. The manual operators include a travel operator 6 to operate the traveling devices 5 and a work operator 7 to operate the working device 4.

The traveling device(s) 5 is/are a driver M to support the machine body 2 such that the machine body 2 is allowed to travel. The traveling device(s) 5 is/are operable to be driven to impart a propelling force to the machine body 2. In the present example embodiment, the traveling devices 5 are provided on the left and right sides of the machine body 2. The traveling devices 5 are crawler traveling devices. The user operates the travel operator 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right. Note that the traveling devices 5 are not limited to crawler traveling devices, and may be tire traveling devices.

The working device 4 is attached to the machine body 2. The working device 4 includes an attachment 30, a linkage 16, and a position changer C. The attachment 30 is, for example, a working tool such as a bucket 30*a*, and is attachable and detachable to and from the linkage 16. Examples of attachments 30 other than the bucket 30*a* include earth augers, angle brooms, crushers, grapples, cold planers, sweepers, skid cutters, skid graders, stump grinders, snow blowers, snow pushers, spreaders, dozer blades, trenchers, breakers, pallet forks, hopper brooms, mowers, rippers, loader arms, rotary tillers, and the like. Attachments 30 of each type may have different specifications such as work content, structures, sizes and/or shapes.

The linkage 16 is provided on the position changer C to attach and detach an attachment 30 thereto and therefrom. The linkage 16 is supported by the machine body 2. The position changer C is a driver M to connect the linkage 16 and the machine body 2 and to be driven to change the position of the linkage 16 relative to the machine body 2. That is, the position changer C is a device to change the relative position between the linkage 16 and the machine body 2. To this end, the machine body 2 supports the linkage 16 via the position changer C. A first end portion (rear end portion) of the position changer C is coupled to the machine body 2, and the linkage 16 is provided at a second end portion (front end portion) of the position changer C. The position changer C is operable to, for example, raise and lower the linkage 16 to change the relative position between the linkage 16 and the machine body 2 to move the position of the attachment 30 connected to the linkage 16.

In the present example embodiment, the position changer C includes arm(s) 11, lift link(s) 12, control link(s) 13, arm cylinder(s) 14, and front cylinder(s) 15. The arms 11, the lift links 12, the control links 13, the arm cylinders 14, and the front cylinders 15 are provided at the left and right of the cabin 3. The left and right arms 11 are connected to each other by a connector 17 at an intermediate portion of their front portion. The left arm 11 has, at the front portion thereof, a hydraulic fluid outlet port (power output port) 18*a* and a hydraulic fluid inlet port 18*b*.

The lift links 12 and the control links 13 support proximal portions (rear portions) of the arms 11 via shafts such that the arms 11 are swingable up and down. The arm cylinders 14 each have one end thereof pivotally connected to a corresponding one of the arms 11 via a shaft and the other end thereof pivotally connected to a lower rear portion of the machine body 2 via a shaft. Upon operation of the work operator 7 along a first direction by the user of the working vehicle 1, the arm cylinders 14 extend or retract and the arms 11 ascend or descend (swing upward or downward).

Note that the position changer C mentioned above is an example and that this does not imply any limitation. For example, in the case where the working vehicle 1 is a backhoe, the position changer C includes an arm, a boom and the like. In the case where the working vehicle 1 is a tractor, the position changer C is a lifter such as a three-point linkage.

The following details the linkage 16. The linkage 16 is a quick hitch (hitch) selectively operable in a first mode in which attachments 30 are allowed to be attached and detached and a second mode in which attachments 30 are restricted from being attached and detached. The proximal end of the quick hitch 16 is attached to the distal portions of the arms 11 via shaft(s) such that the quick hitch 16 is swingable up and down. The quick hitch 16 can easily attach and detach various types of attachment 30 thereto and therefrom. The driver of the working vehicle 1 can easily replace the attachment 30 with another one using the quick hitch 16. For this reason, the quick hitch 16 is also called a "quick changer". In the example shown in FIG. 14, a bucket 30*a*, which is an example of the attachment 30, is attached to the front portion of the quick hitch 16.

The quick hitch 16 has, connected to a rear portion thereof, the distal ends of the arms 11 and ends of the front cylinders 15 via respective shafts such that the arms 11 and the front cylinders 15 are pivotable. The opposite ends of the front cylinders 15 are pivotally connected to the connector 17 via shafts. Upon operation of the work operator 7 along a second direction by the user, the front cylinders 15 extend or retract and the quick hitch 16 swings upward or rearward. With this, the bucket 30*a* attached to the quick hitch 16, swinging upward or downward, performs shoveling or dumping.

Figure 15:
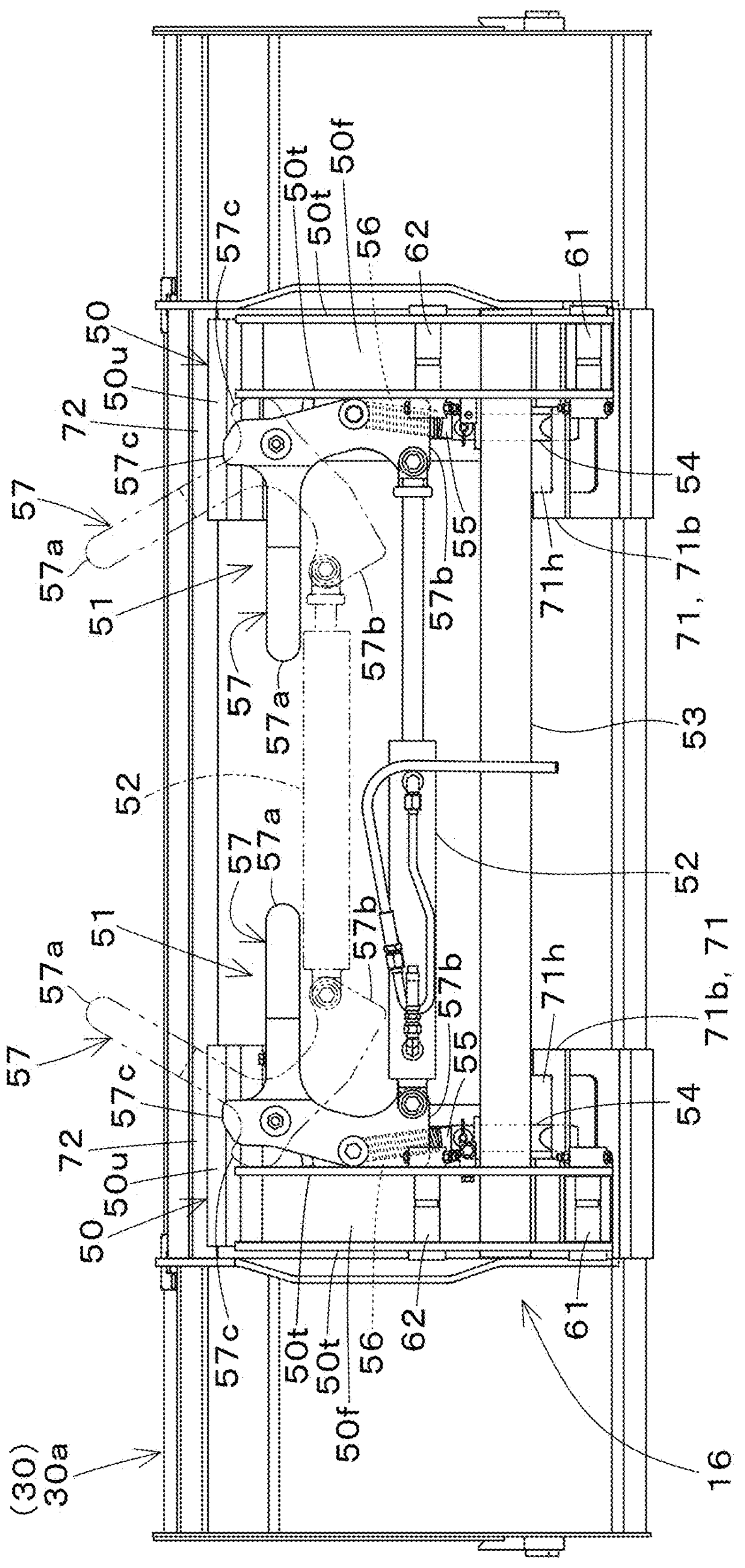
FIG. 15 is an elevational view of a quick hitch.
Figure 16A:
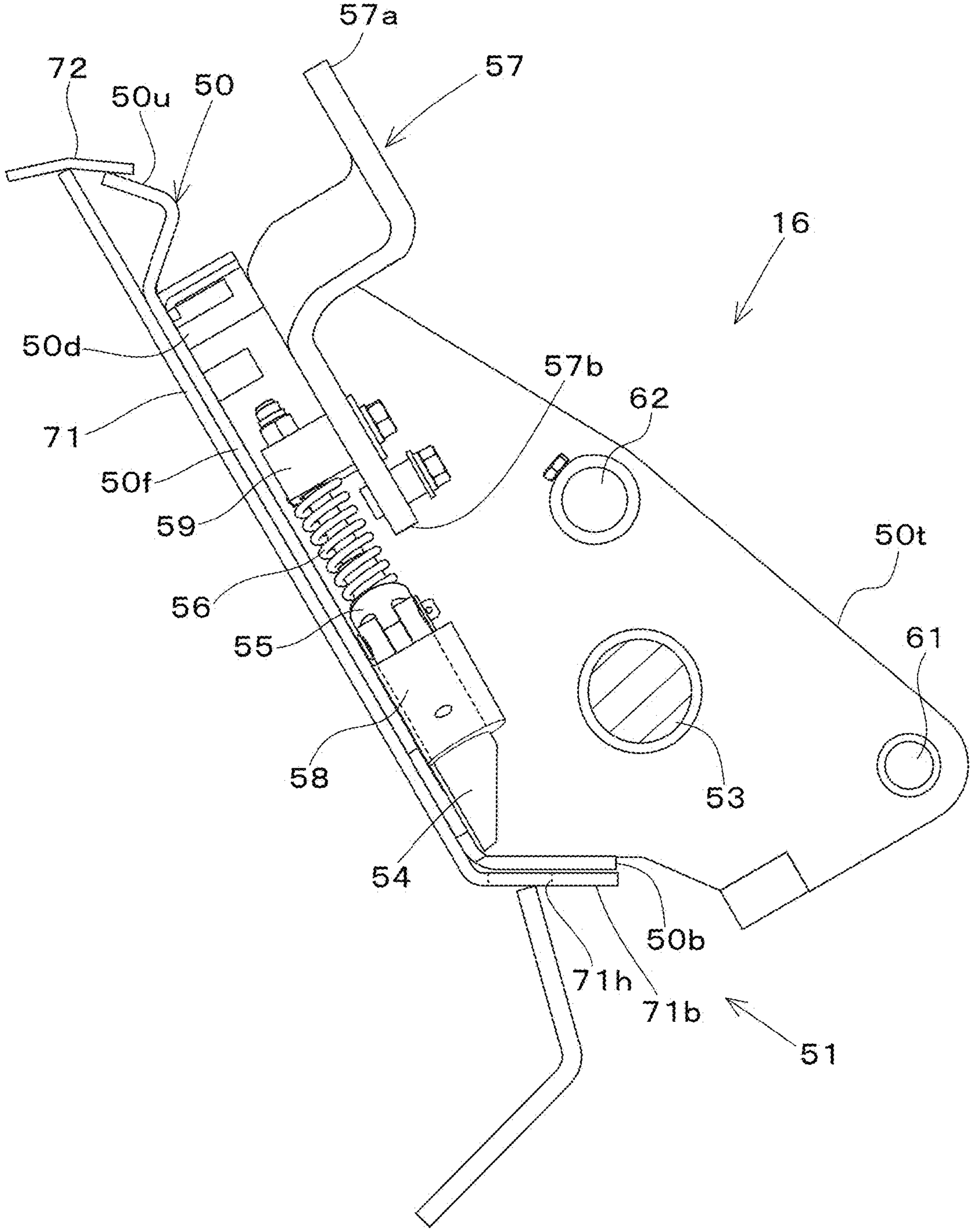
FIG. 16A is a side view of an attachment unlatched by a quick hitch.
Figure 16B:
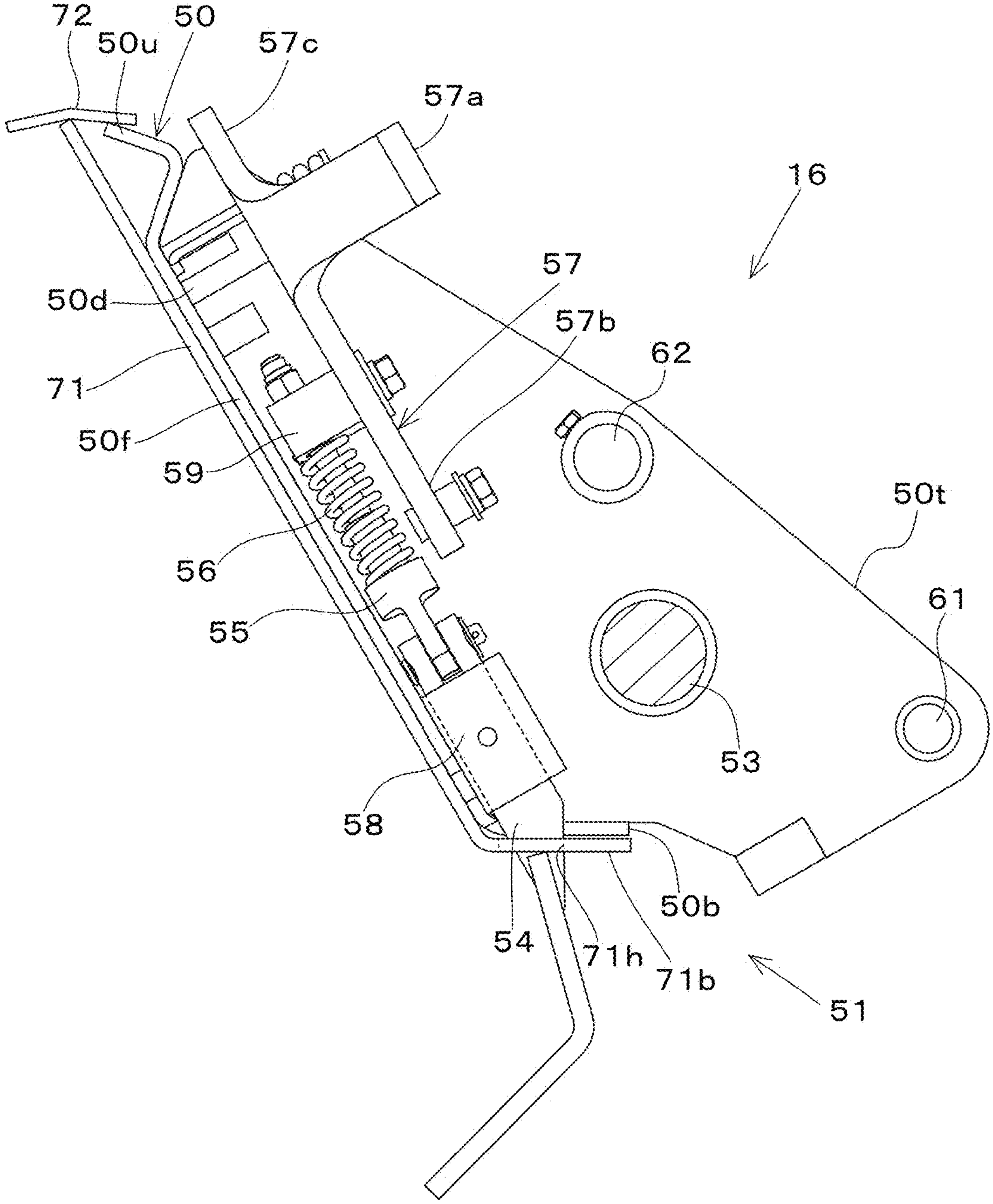
FIG. 16B is a side view of an attachment latched by a quick hitch.

FIG. 15 is an elevational view of the quick hitch 16. Specifically, FIG. 15 illustrates the quick hitch 16 in FIG. 14 as viewed from the machine body 2 of the working vehicle 1. FIG. 16A is a side view illustrating the quick hitch 16 in an unlatching state. FIG. 16B is a side view illustrating the quick hitch 16 in a latching state.

The quick hitch 16 includes a pair of left and right brackets 50, a pair of left and right latching mechanisms 51, a latch cylinder 52, and the like. The brackets 50 hold the attachment 30. The latching mechanisms 51, when in the first mode, do not hold (secure) the attachment 30 to allow the attachment 30 to be detached from the brackets 50 (unlatching state). The latching mechanisms 51, when in the second mode, have the attachment 30 secured to the brackets 50 (quick hitch 16) to restrict the attachment 30 from being detached or restrict an attachment 31 from being attached (latching state). The latch cylinder 52 is a latch actuator to actuate the latching mechanisms 51 selectively in the unlatching state or the latching state. In other words, the quick hitch 16 is switched between the first mode and the second mode by the latch cylinder 52 being driven.

As illustrated in FIG. 16A, each of the brackets 50 includes a front plate 50*f* and a pair of connector plates 50*t* projecting rearward from the front plate 50*f*. The connector plates 50*t* have pivotally connected thereto the distal ends of the left and right arms 11 (FIG. 14) via shafts 61, and have pivotally connected thereto ends of the left and right front cylinders 15 (FIG. 14) via shafts 62. The connector plates 50*t* are connected to a beam 53, so that the pair of brackets 50 are combined.

The front plate 50*f* of each of the brackets 50 includes an upper portion 50*u* bent in the form of the letter V as illustrated in FIG. 16A. The front plate 50*f* includes a lower portion 50*b* bent such that the lower portion 50*b* projects diagonally rearward. A top plate 72 bent downward is provided above a base plate 71 of the attachment 30. The base plate 71 includes a lower portion 71*b* bent such that the lower portion 71*b* projects diagonally rearward. The lower portion 71*b* of the base plate 71 has a through-hole 71*h*.

The upper portions 50*u* of the front plates 50*f* of the brackets 50 are inserted into the gap between the base plate 71 and the top plate 72 of the attachment 30 and engage with the back surface of the top plate 72, the front surfaces of the front plates 50*f* engage with the base plate 71, and the lower portions 50*b* of the front plates 50*f* engage with the lower portion 71*b* of the base plate 71. With this, the attachment 30 is held by the brackets 50 (latching state, second mode).

The latching mechanisms 51 are located inward of the connector plates 50*t* of the brackets 50 in FIG. 15. Each of the latching mechanisms 51 includes, as illustrated in FIG. 16A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 15. The latch lever 57 includes a bent intermediate portion which is rotatably connected to a mount 50*d* on a corresponding bracket 50 via pin(s) as illustrated in FIG. 16A. The latch lever 57 includes a first projecting portion 57*a* which projects inward from corresponding connector plates 50*t* as illustrated in FIG. 15. The latch lever 57 includes a second projecting portion 57*b* projecting downward. The second projecting portion 57*b* has, connected to a back surface of a central portion thereof, the holder 59 via pin(s) as illustrated in FIG. 16A. The latch lever 57 includes a third projecting portion 57*c* which projects upward as illustrated in FIG. 15.

The latch cylinder 52 is a hydraulic cylinder which is positioned laterally and located above the beam 53. The latch cylinder 52 has a first end (distal end of the rod) pivotally connected to the distal end portion of the second projecting portion 57*b* of one of the latch levers 57 (right latch lever 57 in FIG. 15) via pin(s). The latch cylinder 52 has a second end (bottom of the cylinder case) pivotally connected to the distal end portion of the second projecting portion 57*b* of the other of the latch levers 57 (the left latch lever 57 in FIG. 15) via pin(s).

The retraction of the latch cylinder 52, as indicated by dot-dot-dash lines in FIG. 15, causes the second projecting portions 57*b* of the left and right latch levers 57 to approach each other, causing the latch levers 57 to pivot upward. Then, as illustrated in FIG. 16A, the links 55 and the latch pins 54 move upward and the latch pins 54 detach from the through-holes 71*h* in the base plate 71 of the attachment 30.

With this, the latching mechanisms 51 are placed in their unlatching state (first mode) in which the latching mechanisms 51 do not hold the attachment 30, allowing the attachment 30 to be detached from the quick hitch 16. The third projecting portions 57*c* of the latch levers 57 contact corresponding connector plates 50*t* of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 15 from the state as illustrated in FIG. 16A, the second projecting portions 57*b* of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 16B, the latch pins 54 are inserted in the through-holes 71*h* in the base plate 71 of the attachment 30, so that the inclined surfaces of the latch pins 54 contact the side walls of the through-holes 71*h*.

With this, the latching mechanisms 51 are placed in their latching state (second mode) in which the latching mechanisms 51 hold the attachment 30, and the attachment 30 is attached to the quick hitch 16. The second projecting portions 57*b* of the latch levers 57 contact corresponding connector plates 50*t* of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57*a* of the latch levers 57 are positioned horizontally, the user seated on the user's seat 8 of the working vehicle 1 confirms that the attachment 30 is attached to the quick hitch 16 (working vehicle 1) by looking at the horizontally positioned first projecting portions 57*a*.

Starting from the state as illustrated in FIG. 14 in which the bucket 30*a* is attached to the quick hitch 16, the bucket 30*a* is detached and another attachment 30 is attached to the quick hitch 16. This makes it possible to perform work other than excavation (or some other excavation work) using the other attachment 30.

FIG. 1 is a block diagram of an attachment usage system 100 and the working vehicle 1 according to the present example embodiment. The attachment usage system 100 includes the working vehicle(s) 1 and attachment(s) 30. The example in FIG. 1 includes one working vehicle 1 and two attachments 30, but the number of working vehicles 1 and the number of attachments 30 included in the attachment usage system 100 may be selected appropriately.

The working vehicle 1 includes a controller 21, a storing device (memory and/or storage) 22, a receiver 23, a communicator 24, a user interface (indicated as "UI" in FIG. 1) 25, a battery 20, switches (each indicated as "SW" in FIGS. 1) 26 to 29, and/or the like.

The controller 21 may include a processing circuit that includes one or more processors. The controller 21 is configured or programmed to control the working vehicle 1 and performs various controls relating to the working vehicle 1. The controller 21 is communicably connected to a plurality of devices in or on the working vehicle 1 via in-vehicle network(s) such as CAN, ISOBUS, LIN, FlexRay and/or the like.

The controller 21 may include one or more memories, various kinds of analog circuits, various kinds of digital circuits, and/or the like. The one or more memories contain (store) software program(s) to be executed by one or more processors and various data. Specifically, among the one or more memories included in the controller 21, a memory **21*a* (storing unit, internal memory) includes a volatile or non-volatile memory. The controller 21 uses, for example, a predetermined storage area of the storing unit 21*a*** including a volatile memory as a buffer for temporary storage of information and data.

The controller 21 is communicably connected to the storing device 22 (nonvolatile memory), and the storing device 22 is provided externally to the controller 21. The storing unit **21*a* and the storing device 22 store software program(s) and control data for the controller 21 to control the operation of each element. The storing device 22 stores pieces of control data corresponding to various types of attachments 30**.

The controller 21 is configured or programmed to read the software program(s) and control data from the storing device 22 and perform various processes based on the software program(s) and the control data, via one or more processors. Note that the controller 21 may be configured or programmed to also perform various processes based on predetermined logic circuit(s) via one or more processors.

Examples of the processors include central processing unit (CPU), graphics processing unit (GPU), digital signal processor (DSP), field programmable gate array (FPGA), and application specific integrated circuit (ASIC).

Note that the controller 21 may include a plurality of physically separated processors cooperating to perform various processes, and the structure thereof is not limited to those described above. In such a case, the plurality of processors are provided in or on respective one or more computers physically separated from the working vehicle 1, and are communicably connected to each other via a network such as an in-vehicle network, LAN, WAN, and/or the Internet.

The software program(s) may be stored in recording medium (media) (nonvolatile memory (memories) such as HDD, SSD, CD-ROM, and/or DVD-ROM) communicably connected to the controller 21 and/or external server(s) 80 connected to the controller 21 via a network, and may be installed from the medium, the server, and/or the like into the memory.

The receiver 23 is a device to receive wireless signals Q1 compliant with a near field communication standard. Specifically, the receiver 23 is a beacon scanner to receive wireless signals (beacon signals) Q1 compliant with Bluetooth (registered trademark) Low Energy which is a near field communication standard. The beacon scanner 23 measures the received signal strength indicator (RSSI, received signal strength) of the received wireless signals Q1. Note that RSSI may be hereinafter simply referred to as received signal strength. The beacon scanner 23 is provided in or on the machine body 2.

The communicator 24 communicates with a portable device 70 via the Internet or wireless LAN, etc. Note that the communicator 24 may be communicable with a work assistant (e.g., server 80, describe later) via the Internet. The portable device 70 is a smartphone, a tablet computer, and/or the like. The user interface 25 includes, for example, a touchscreen (touch panel) and/or the like. For another example, the user interface 25 may include an input and an output provided independently of each other.

The battery 20 supplies electricity to electric equipment in and/or on the working vehicle 1. The operation actuators 26 and 27, the auxiliary mode switch 28, and the auxiliary output switch 29 are respective operation switches to be operated by the user of the working vehicle 1. The operation actuators 26 and 27 are momentary operation switches. The user interface 25 and the switches 26 to 29 are provided operably in the vicinity of the user's seat 8 in the cabin 3.

The operation actuators 26 and 27 are operated to switch between the first mode and the second mode of the quick hitch 16. In the present example embodiment, the operation actuators 26 and 27 include an attaching switch (first operation switch) 26 to be operated to attach an attachment 30 to the quick hitch 16 and a detaching switch (second operation switch) 27 to be operated to allow the attachment 30 to be detached from the quick hitch 16. That is, the attaching switch 26 is operated to switch the quick hitch 16 from the first mode to the second mode. The detaching switch 27 is operated to switch the quick hitch 16 from the second mode to the first mode. The auxiliary mode switch 28 is operated to start an auxiliary mode in which specific attachment(s) 30 are usable. The auxiliary output switch (third operation switch) 29 is operated to supply (transmit) hydraulic fluid as power to the hydraulic fluid outlet port **18*a***.

Note that the above description about the present example embodiment discusses a case in which the operation actuators 26 and 27 include an attaching switch 26 and a detaching switch 27, but the working vehicle 1 may include a single operation actuator 26, 27 (attaching/detaching switch) to selectively receive an operation to attach an attachment 30 to the quick hitch 16 or an operation to detach an attachment 30 (allow an attachment 30 to be detached) from the quick hitch 16.

The switches 26 to 29, the travel operator 6, the work operator 7 and the like are not limited to hardware operation switches, operating levers and the like, and, for example, may be software keys and the like on the display screen of the user interface 25.

The working vehicle 1 includes, as hydraulic-related features, a main pump P1, a pilot pump P2, a control valve unit (indicated as "CVU" in FIG. 1) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The controller 21 controls the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operator 6 and work operator 7, operating valves corresponding to the travel operator 6 and the work operator 7, switching valve(s), and the like.

The control valve unit 40 allows hydraulic fluid supplied from the main pump P1 through fluid passage(s) to flow to the arm cylinders 14 and the front cylinders 15 of the working device 4, the latch cylinder 52 of the quick hitch 16, and the hydraulic fluid outlet port 18*a*. The control valve unit 40 also allows hydraulic fluid that flows from the arm cylinders 14, the front cylinders 15, the latch cylinder 52, and the hydraulic fluid inlet port 18*b* (return fluid) to be discharged. The control valve unit 40 controls the direction and amount of supply of hydraulic fluid to the arm cylinders 14, the front cylinders 15, and the latch cylinder 52. The control valve unit 40 also controls the amount of supply of hydraulic fluid to the hydraulic fluid outlet port 18*a*.

Specifically, the control valve unit 40 includes control valves 40*a*, 40*b*, 40*c*, and 40*d* corresponding to the arm cylinders 14, the front cylinders 15, the latch cylinder 52, and the ports 18*a* and 18*b*. Each of the control valves 40*a*, 40*b*, 40*c*, and 40*d* is switchable between a neutral position, a first position, and a second position. At least the control valves 40*c* and 40*d* of the control valves 40*a*, 40*b*, 40*c*, and 40*d* are electrically actuated. The control valves 40*a*, 40*b*, 40*c*, and 40*d* are normally held in the neutral position by the elastic force of a spring.

The operating valve(s) of the operating equipment 47 and/or the like that correspond to the work operator 7 are actuated according to the manner in which the work operator 7 is operated, thus allowing the pilot pressure of pilot fluid from the pilot pump P2 to act on pressure receiver(s) of the control valve(s) 40*a* and/or 40*b*. For example, the work operator 7 may be supported on operating valves of the operating equipment 47 and the operating valves may be physically actuated by operation of the work operator 7. Additionally or alternatively, a detection sensor to detect the amount (degree) and direction of operation of the work operator 7 may be provided and the controller 21 may electrically actuate the operating valve(s) based on the detection result from the detection sensor. With this, the control valve(s) 40*a* and/or 40*b* is/are switched from the neutral position to the first position or the second position, so that hydraulic fluid from the main pump P1 is supplied through the control valve(s) 40*a* and/or 40*b* to the arm cylinders 14 and/or the front cylinders 15 to cause the arm cylinders 14 and/or the front cylinders 15 to extend or retract. It follows that the arms 11 and/or the attachment 30 such as the bucket 30*a* attached to the quick hitch 16 swing.

While the attaching switch 26 is being operated, the controller 21 places the control valve 40*c* in the first position to allow hydraulic fluid from the main pump P1 to be supplied to the latch cylinder 52 in the first direction to cause the latch cylinder 52 to extend. Accordingly, the operation of the attaching switch 26 that lasts for a fifth predetermined period of time T5 or more while the latching mechanisms 51 are in the unlatching state causes the latch cylinder 52 to extend to the predetermined degree or more, bringing the latching mechanisms 51 into the latching state. Even if the attaching switch 26 is operated, provided that the operation only lasts for a period less than the fifth predetermined period of time T5, the latch cylinder 52 does not extend to the predetermined degree or more and therefore the latching mechanisms 51 are not brought into the latching state. Therefore, the latching mechanisms 51 are moved back by the spring back force of the coil springs 56 to the original unlatching state.

On the contrary, while the detaching switch 27 is being operated, the controller 21 places the control valve 40*c* in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a sixth predetermined period of time T6 or more while the latching mechanisms 51 are in the latching state causes the latch cylinder 52 to retract to a predetermined degree or more, bringing the latching mechanisms 51 into the unlatching state. Even if the detaching switch 27 is operated, provided that the operation only lasts for a period less than the sixth predetermined period of time T6, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state.

The fifth predetermined period of time T5 and the sixth predetermined period of time T6 are each, for example, about 2 to 3 seconds. The fifth predetermined period of time T5 and the sixth predetermined period of time T6 may be the same period or different periods. The specific values of the fifth predetermined period of time T5 and the sixth predetermined period of time T6 are examples, and not limited to the values above. The same applies to predetermined periods of time T1 to T4 and T7 (described later).

When the auxiliary mode switch 28 is operated and the auxiliary mode is selected, a specific attachment 30 is attached to the quick hitch 16. The hydraulic fluid outlet port 18*a* and a hydraulic fluid inlet port 38*b* of the specific attachment 30*b* are connected together by a hose, and the hydraulic fluid inlet port 18*b* and a hydraulic fluid outlet port 38*a* of the specific attachment 30*b* are connected together by a hose.

Upon operation of the auxiliary output switch 29 under such circumstances, the controller 21 switches the control valve 40*d* from the neutral position to the first position or the second position. With this, hydraulic fluid from the main pump P1 is supplied (transmitted) through a fluid passage 45*a* to the hydraulic fluid outlet port 18*a*, and hydraulic fluid flowing into a fluid passage 45*b* from the hydraulic fluid inlet port 18*b* is drained through the control valve unit 40.

With this, hydraulic fluid discharged through the hydraulic fluid outlet port 18*a* is introduced into the specific attachment 30*b* through the hydraulic fluid inlet port 38*b* via a hose or the like. Furthermore, hydraulic fluid (return fluid) discharged through the hydraulic fluid outlet port 38*a* of the specific attachment 30*b* is introduced through the hydraulic fluid inlet port 18*b* via a hose or the like and is drained from the control valve unit 40. Since hydraulic fluid is introduced and discharged to and from the specific attachment 30*b* as such, hydraulic actuators 36 such as a hydraulic motor and/or hydraulic cylinder(s) of the attachment 30*b* are actuated, making it possible to perform work using the attachment 30*b*.

When allowing hydraulic fluid to be introduced and discharged to and from the specific attachment 30*b*, the controller 21 changes the opening of the control valve 40*d* depending on what specific attachment 30*b* is attached to the quick hitch 16, to adjust the flow rate or hydraulic pressure of hydraulic fluid supplied to the hydraulic fluid outlet port 18*a*. For example, the controller 21 may cause the flow rate sensor 43 to detect the flow rate of hydraulic fluid flowing through the fluid passage 45*a* and control the opening of the control valve 40*d*. Additionally or alternatively, the controller 21 may cause the pressure sensor 44 to detect the hydraulic pressure of hydraulic pressure flowing through the fluid passage 45*a* and control the opening of the control valve 40*d*.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating valve(s) of the operating equipment 47 and/or the like that correspond to the travel operator 6 are actuated according to the manner in which the travel operator 6 is operated, thus allowing the pilot pressure of pilot fluid from the pilot pump P2 to act on pressure receiver(s) of the swash plate(s) of the hydraulic pump(s) of the corresponding HST(s) 46L and/or 46R and changing the angle of inclination of the swash plate(s). For example, the travel operator 6 may be supported on the operating valves of the operating equipment 47 and the operating valves may be physically actuated by operation of the travel operator 6. Additionally or alternatively, a detection sensor to detect the amount (degree) and direction of operation of the travel operator 6 may be provided and the controller 21 may electrically actuate the operating valve(s) based on the detection result from the detection sensor. This controls the supply, the stopping of supply, and the direction of supply of hydraulic fluid from the hydraulic pump(s) of the HSTs 46L and/or 46R to the travel motor(s), the travel motor(s) rotate(s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

Furthermore, switching valve(s) for speed changes of the operating equipment 47 and/or like switch(es) positions according to control signal(s) from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The attachment 30 attachable to the working vehicle 1 has a transmitter 33 therein or thereon. The transmitter 33 is a beacon transmitter to periodically transmit a wireless signal Q1 compliant with a near field communication standard. Specifically, the beacon transmitter 33 is a device to periodically transmit an advertisement signal (also called "advertisement packet" or "beacon signal") which is a wireless signal Q1 compliant with Bluetooth (registered trademark) Low Energy. The beacon transmitter 33 looks like a small tag, and is therefore sometimes called a "BLE tag". The beacon transmitter 33 includes a microcomputer, a memory, a transmitter circuit, a battery, a first vibration sensor 34, and/or the like. The elements of the beacon transmitter 33 are driven by electricity from the battery. The beacon transmitter 33 transmits the advertisement signal Q1 at interval(s) of, for example, about 1 second to about 3 seconds, but the intervals are not limited to 1 second to 3 seconds and may be selected as appropriate.

Figure 2:
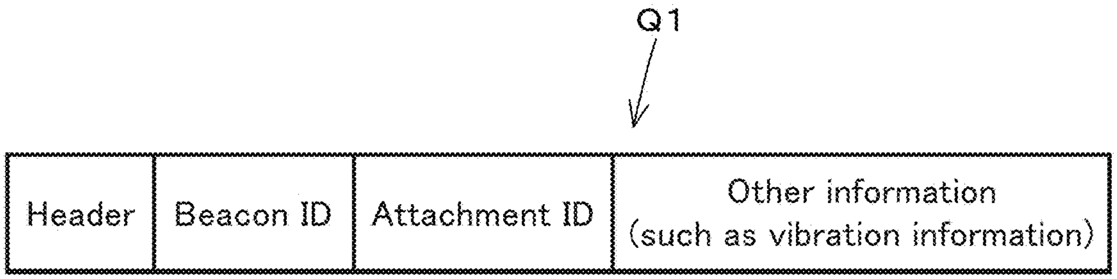
FIG. 2 is a diagram showing an example of information included in an advertisement signal.

FIG. 2 shows an example of information contained in an advertisement signal Q1 transmitted from the beacon transmitter 33. The advertisement signal Q1 includes a header, a beacon ID (tag serial number), an attachment ID, and other information.

The beacon ID is identification information of the beacon transmitter 33 which is the sender of the advertisement signal Q1. The attachment ID is identification information of the attachment 30 in or on which the beacon transmitter 33 which is the sender of the advertisement signal Q1 is provided.

The other information in the advertisement signal Q1 includes first vibration information (which may be hereinafter referred to as "vibration information" for short) relating to the vibration state detected by the first vibration sensor 34 of the beacon transmitter 33 which is the sender, i.e., vibration information relating to the vibration state of the attachment 30 in or on which the beacon transmitter 33 is provided. The first vibration information may include information such as a message indicating whether or not the attachment 30 is vibrating (presence or absence of vibration). The first vibration information may include, instead of or in addition to the information such as a message, a first vibration indicator (numerical value) indicating the magnitude (strength) of vibration detected by the first vibration sensor 34. The first vibration indicator may be, for example, at least one of the displacement, velocity, or acceleration of vibrations of the attachment 30 detected by the first vibration sensor 34. The first vibration information may include a second vibration indicator indicating the frequency of occurrence of the vibration (frequency of vibration occurrence) (how often the vibration occurs) detected by the first vibration sensor 34, a third vibration indicator indicating the duration (vibration duration) of the vibration detected by the first vibration sensor 34, and/or the like. The frequency of vibration occurrence is the number of occurrences of vibrations per seventh predetermined period of time T7. The seventh predetermined period of time T7 is, for example, about 2 to 3 seconds. The vibration duration is the duration of continuous vibration. Inertial sensor(s) such as an acceleration sensor and/or a gyroscope sensor may be used as the first vibration sensor 34.

Note that examples of other information included in the advertisement signal Q1, other than the first vibration information, include the supply amount and the supply pressure of hydraulic fluid to the attachment 30, the name (official name) of the attachment 30, the remaining battery level of the beacon transmitter 33, and the acting time (hour meter) of the attachment 30 having the beacon transmitter 33 attached thereto.

As illustrated in FIG. 14, the beacon transmitter 33 is located on, for example, the back surface of the attachment 30 that faces the machine body 2 of the working vehicle 1. The beacon scanner 23 is located at, for example, the front portion of the machine body 2 that faces the attachment 30. The controller 21 is provided in the machine body 2. Since the beacon scanner 23 is provided in or on the machine body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4.

The advertisement signal Q1 transmitted from the beacon transmitter 33 is received by the beacon scanner 23 of the working vehicle 1. The controller 21 is configured or programmed to select the attachment ID of the attachment 30 attached to the quick hitch 16 from attachment ID(s) included in one or more advertisement signals Q1 received by the beacon scanner 23. The controller 21 is configured or programmed to start a predetermined process based on the selected attachment ID. That is, the controller 21 is configured or programmed to identify the specifications, etc., of the attachment 30 attached to the quick hitch 16 based on the selected attachment ID, and start a predetermined process based on the attachment ID.

An example of the predetermined process is a process in which the controller 21 causes the user interface 25 to output (display) information indicating that the attachment 30 corresponding to the selected attachment ID is attached to the quick hitch 16 (working vehicle 1). Another example of the predetermined process is a process in which the controller 21 controls output of hydraulic fluid (power) to the attachment 30 attached to the quick hitch 16 (controls start and stop of the supply of hydraulic fluid to the attachment 30) according to the selected attachment ID. It is noted here that the controller 21 may also control at least one of the introduction of hydraulic fluid from the attachment 30, the amount of hydraulic fluid supplied to the attachment 30, or the pressure of hydraulic fluid supplied to the attachment 30.

Display data and control data are pre-set for each of the attachment IDs of attachments 30 attachable to the quick hitch 16, i.e., attachments 30 which can be used with the working vehicle 1.

FIG. 3 is a table showing an example of the relationship between the attachment IDs of the attachments 30 attachable to the quick hitch 16 and pieces of display data corresponding to the attachments 30. A piece of display data is data based on which the user interface 25 displays information about a corresponding attachment 30. The display data includes, for example, an icon, name, and specifications of the corresponding attachment 30. Such an attachment ID and display data of the attachment 30 are stored in a predetermined storage area of the nonvolatile memory 22 such that the attachment ID and the display data of the attachment 30 are associated with each other. Note that display data other than that described above may be stored in the storing device 22 such that the display data is associated with the attachment ID.

FIG. 4 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the storing device 22 such that the attachment ID and the control data of the attachment 30 are associated with each other. Note that other control data, such as the level of hydraulic pressure outputted to the attachment 30 and/or the output value of power other than hydraulic fluid, may be stored in the storing device 22 such that the control data is associated with the attachment ID.

The controller 21 is configured or programmed to, when an attachment 30 is attached to the quick hitch 16, perform the first selecting process or the second selecting process to select an ID (attachment ID) of the attachment 30 attached to the quick hitch 16. The controller 21 is configured or programmed to, when the quick hitch 16 is switched from the first mode to the second mode to attach an attachment 30 to the quick hitch 16, perform the first selecting process or the second selecting process. The controller 21 is configured or programmed to determine, based on the operation state of the operation actuator (attaching switch) 26, whether the quick hitch 16 has been switched from the first mode to the second mode to attach the attachment 30 to the quick hitch 16, and perform the first selecting process or the second selecting process.

The controller 21 is configured or programmed to cause the storing unit 21*a* to store (collect), for a first predetermined period of time T1, attachment ID(s) included in one or more advertisement signals Q1 received by the beacon scanner 23 (such a process is referred to as an "attachment information collecting process"). The first predetermined period of time T1 is, for example, about 30 seconds which corresponds to at least one of the time for an attachment 30 to be attached to the working vehicle 1 or the time for the attachment 30 to be replaced with another one.

It is noted here that the controller 21 causes the storing unit 21*a* to also store, for example, information indicating the time at which the advertisement signal Q1 was received or the attachment ID was stored (such as a timestamp) such that the information is associated with the attachment ID.

The controller 21 is configured or programmed to, when an attachment 30 is attached to the quick hitch 16, perform a first selecting process to select an attachment ID satisfying a first condition from one or more attachment ID stored in the storing unit 21*a*. The controller 21 is configured or programmed to, when the quick hitch 16 is switched from the first mode to the second mode to attach the attachment 30 to the hitch, first determine whether any attachment ID satisfying the first condition is stored in the storing unit 21*a*. The controller 21 is configured or programmed to, if one or more attachment IDs satisfying the first condition are stored in the storing unit 21*a*, perform the first selecting process by selecting the attachment ID of the advertisement signal Q1 with the highest RSSI from the one or more attachment IDs satisfying the first condition. With this, in the first selecting process, the controller 21 selects an attachment ID which satisfies the first condition and which is included in the advertisement signal Q1 with the highest RSSI from the one or more attachment IDs stored in the storing unit 21*a*.

The attachment ID corresponding to the highest RSSI as described above is a predetermined condition based on which one of attachment ID(s) collected in the storing unit 21*a* is to be selected. Note that the RSSIs stored in the storing unit 21*a* may include one or more highest RSSIs. If a plurality of the highest RSSIs are stored in the storing unit 21*a*, such RSSIs have the same value and correspond to the same attachment ID. Therefore, the controller 21 may select one of the same attachment IDs (for example, the attachment ID corresponding to the latest receipt time) and identify the attachment 30 attached to the quick hitch 16 based on the selected attachment ID.

On the contrary, the controller 21 is configured or programmed to, if the storing unit 21*a* stores no attachment IDs satisfying the first condition, perform a second selecting process to select an attachment ID satisfying a second condition from attachment ID(s) included in one or more advertisement signals Q1 received by the beacon scanner 23 after the attachment 30 is attached to the quick hitch 16. That is, the controller 21 is configured or programmed to, if determining that the storing unit 21*a* stores no attachment IDs satisfying the first condition, perform the second selecting process instead of the first selecting process.

The controller 21 is configured or programmed to, in the second selecting process, when the beacon scanner 23 receives an advertisement signal Q1 including an attachment ID satisfying the second condition, select the attachment ID included in the advertisement signal Q1. That is, the controller 21 is configured or programmed to, if the storing unit 21*a* stores no attachment IDs satisfying the first condition, perform the second selecting process in which, upon each receipt of an advertisement signal Q1 by the beacon scanner 23, the controller 21 determines whether the attachment ID included in the advertisement signal Q1 satisfies the second condition. If the controller 21 determines that the attachment ID satisfies the second condition, the controller 21 selects the attachment ID without referring to other attachment IDs.

The controller 21 is configured or programmed to end the second selecting process if, in the second selecting process, the second condition is satisfied by none of the attachment ID(s) included in one or more advertisement signals Q1 received by the beacon scanner 23 before a third predetermined period of time T3 has passed since the attachment 30 was attached to the quick hitch 16 (the second condition is satisfied by none of the attachment ID(s) included in one or more advertisement signals Q1 received by the beacon scanner 23 during a third predetermined period of time T3 starting when the attachment 30 is attached to the quick hitch 16). The third predetermined period of time T3 differs in duration from the first predetermined period of time T1. For example, the third predetermined period of time T3 is defined to be shorter than the first predetermined period of time T1. Specifically, the third predetermined period of time T3 is about 10 seconds. The third predetermined period of time T3 is not limited to about 10 seconds, and may be the same in duration as the first predetermined period of time T1 or may be defined to be longer than the first predetermined period of time T1.

That is, the first selecting process and the second selecting process differ from each other in that the first selecting process is a process to select an attachment ID by referring to attachment ID(s) collected (stored) in the storing unit 21*a*, whereas the second selecting process is a process to select an attachment ID by referring to attachment ID(s) of advertisement signal(s) Q1 newly received by the beacon scanner 23.

The first condition and the second condition differ from each other in the degree of a selection criterion based on which an attachment ID is selected. The second condition is stricter than the first condition in the degree of the selection criterion based on which an attachment ID is selected. In other words, the controller 21 is configured or programmed such that attachment IDs satisfying the first condition may not satisfy the second condition. On the other hand, in the present example embodiment, the controller 21 is configured or programmed such that attachment IDs satisfying the second condition also satisfy the first condition.

The controller 21 may be configured or programmed to, upon ending the second selecting process after the passage of the third predetermined period of time T3, allow the user interface 25 to receive input of information (input information) indicating the attachment 30 attached to the quick hitch 16.

FIG. 5 is a diagram showing an example of an attachment list L1. The data of the attachment list L1 is stored in the storing device 22. The attachment list L1 displayed by the user interface 25 includes attachment information such as the names, attachment IDs and the specifications and/or the like of a plurality of attachments 30 attachable to the quick hitch 16. The user interface 25 displays the attachment list L1, and receives input of input information from the user such as the driver upon the user selecting an attachment 30 from the attachment list L1.

Note that the above description discusses example cases in which the user interface 25 displays the attachment list L1 and the user selects an attachment 30 to enter input information, but the information displayed by the user interface 25 is not limited to the attachment list L1. For example, instead of displaying the attachment list L1, the user interface 25 may display the icons (symbols) of a plurality of attachments 30 attachable to the quick hitch 16. In such a case, when the user selects (designates) an icon, the user interface 25 receives input of input information.

The user interface 25 may display an input screen for attachment information such as the attachment ID instead of displaying the attachment list L1. In such a case, the user interface 25 receives input of input information when the user inputs attachment information about the attachment 30 attached to the quick hitch 16 on the input screen. With this, the controller 21 selects the attachment ID of the attachment 30 indicated by the input information inputted via the user interface 25.

The attachment usage system 100 may be configured such that, for example, the administrator (manager) performs a predetermined operation on the user interface 25 to switch between (i) an automatic selection mode in which the first selecting process and the second selecting process are performed as described above, and (ii) a manual selection mode in which the user such as the driver manually selects the ID of an attachment 30.

The manual selection mode is a mode in which the controller 21 starts a predetermined process according to information indicating the attachment 30 received via the user interface 25. The manual selection mode is also a mode in which the controller 21 identifies the attachment 30 attached to the quick hitch 16 based on the information indicating the attachment 30 received via the user interface 25. That is, in the manual selection mode, the controller 21 allows the user interface 25 to receive input of information (input information) indicating the attachment 30 attached to the quick hitch 16. In the manual selection mode, similarly to after the end of the second selecting process, for example, the user of the working vehicle 1 inputs the input information via the user interface 25. The administrator uses the user interface 25 to place the working vehicle 1 in the automatic selection mode or the manual selection mode according to the demand of the user of the working vehicle 1 or the like.

The following details the first condition and the second condition. For example, the first condition and the second condition each include a condition (first selection condition) in which the attachment ID to be selected by the controller 21 is an attachment ID included in an advertisement signal Q1 with an RSSI higher than a predetermined value. The second condition includes a condition in which the attachment ID to be selected by the controller 21 is an attachment ID included in an advertisement signal Q1 with an RSSI higher (greater) compared to the first condition. The controller 21 is configured or programmed to, in the first selecting process, if the RSSI of an advertisement signal Q1 is higher than a first signal threshold a1, determine that the first selection condition of the first condition is satisfied. On the other hand, the controller 21 is configured or programmed to, in the second selecting process, if the acquired RSSI is higher than a second signal threshold a2, determine that the first selection condition of the second condition is satisfied. The second signal threshold a2 is defined to be at least greater than the first signal threshold a1 ($a2>a1$).

At least the second condition of the first and second conditions may include a condition (second selection condition) in which the attachment ID to be selected by the controller 21 is an attachment ID corresponding to an advertisement signal Q1 including first vibration information indicating that the attachment 30 is vibrating. The controller 21 is configured or programmed to, if information read from the advertisement signal Q1 includes first vibration information indicating that the attachment 30 is vibrating, determine that there is vibration on the attachment 30 and the second selection condition is satisfied.

Note that the controller 21 may be configured or programmed to determine that there is vibration on the attachment 30 and the second selection condition is satisfied if the first vibration information includes a first vibration indicator and the first vibration indicator is greater than a vibration threshold (threshold) b. The controller 21 may be configured or programmed to determine that there is vibration on the attachment 30 and the second selection condition is satisfied if the first vibration information includes a second vibration indicator and the second vibration indicator is greater than a frequency threshold (threshold) c. The controller 21 may be configured or programmed to determine that there is vibration on the attachment 30 and the second selection condition is satisfied if the first vibration information includes a third vibration indicator and the third vibration indicator is greater than a time threshold (threshold) d.

In the case where the first vibration information includes two or more of the first to third vibration indicators, the controller 21 may determine whether there is vibration on the attachment 30 based on such indicators. That is, the controller 21 may determine that the second selection condition is satisfied when one or more of the values-for-determination satisfy corresponding conditions, and may determine that the second selection condition is satisfied when all the values-for-determination satisfy corresponding conditions.

At least the second condition of the first and second conditions may include a condition relating to the degree of vibration, and the controller 21 may select an attachment ID using the condition. For example, the controller 21 may acquire indicator(s) (value(s)-for-determination) indicating at least one of the vibration strength of the attachment 30, the frequency of vibration occurrence of the attachment 30, or the vibration duration of the attachment 30 based on the first vibration information, and the second condition may include a condition (third selection condition) in which the attachment ID to be selected by the controller 21 is an attachment ID included in an advertisement signal Q1 with higher (greater) value(s)-for-determination compared to the first condition. For example, if the first vibration information includes a first vibration indicator, in the first selecting process, the controller 21 determines that the third selection condition of the first condition is satisfied when the first vibration indicator (value-for-determination) is greater than a first vibration threshold b1. On the other hand, in the second selecting process, if the first vibration indicator is greater than a second vibration threshold b2, the controller 21 determines that the third selection condition of the second condition is satisfied. The second vibration threshold b2 is defined to be at least greater than the first vibration threshold b1 (b2>b1).

In a case that the first vibration information includes a second vibration indicator, in the first selecting process, if the second vibration indicator (value-for-determination) is greater than a first frequency threshold c1, the controller 21 determines that the third selection condition of the first condition is satisfied. On the other hand, in the second selecting process, if the second vibration indicator is greater than a second frequency threshold c2, the controller 21 determines that the third selection condition of the second condition is satisfied. The second frequency threshold c2 is defined to be at least greater than the first frequency threshold c1 (c2>c1).

In a case that the first vibration information includes a third vibration indicator, in the first selecting process, if the third vibration indicator (value-for-determination) is greater than a first duration threshold d1, the controller 21 determines that the third selection condition of the first condition is satisfied. On the other hand, in the second selecting process, if the third vibration indicator is greater than a second duration threshold d2, the controller 21 determines that the third selection condition of the second condition is satisfied. The second duration threshold d2 is defined to be at least greater than the first duration threshold d1 (d2>d1).

Furthermore, in a case that the first vibration information includes two or more of the first to third vibration indicators (values-for-determination), the controller 21 may determine whether the third selection condition is satisfied based on such values-for-determination. That is, the controller 21 may determine that the third selection condition is satisfied when one or more of the values-for-determination satisfy corresponding conditions, and may determine that the third selection condition is satisfied when all the values-for-determination satisfy corresponding conditions.

At least the second condition of the first and second conditions may include a condition (fourth selection condition) relating to the difference between vibration of the attachment 30 and vibration of the machine body 2, and the controller 21 may select an attachment ID using the condition. In such a case, the machine body 2 is provided with a second vibration sensor (vibration detector) 65 separately from the first vibration sensor 34 of the beacon transmitter 33. At least the second condition of the first and second conditions may include a condition in which the attachment ID to be selected by the controller 21 is an attachment ID corresponding to an advertisement signal Q1 including first vibration information in which the vibration of the attachment 30 relatively matches the vibration of the machine body 2 detected by the vibration detector 65.

The second vibration sensor 65 is located at a front portion of the machine body 2, and is, for example, located in the vicinity of the beacon scanner 23. Inertial sensor(s) such as an acceleration sensor, a gyroscope sensor, and/or the like is/are used as the second vibration sensor 65. Note that the position at which the second vibration sensor 65 is attached is not limited to the front portion of the machine body 2, and may be a different location.

The second vibration sensor 65 detects the vibration of the machine body 2, and outputs the detection result to the controller 21. With this, the controller 21 can acquire second vibration information indicating the vibration of the machine body 2 based on the detection result outputted from the second vibration sensor 65. When the controller 21 acquires second vibration information, the controller 21 can cause the second vibration information to be stored (collected) for a fourth predetermined period of time T4. The fourth predetermined period of time T4 is, for example, equal to or longer than the first predetermined period of time T1. The controller 21, for example, causes the storing unit 21*a* to store the second vibration information associated also with the time of acquisition of the detection result from the second vibration sensor 65 and/or information indicating the time the second vibration information was stored (time stamp and/or the like).

The controller 21 compares the first vibration information included in the advertisement signal Q1 received by the beacon scanner 23 with the second vibration information, and determines whether the vibration of the attachment 30 and the vibration of the machine body 2 relatively match each other. In particular, in determining whether the vibration of the attachment 30 and the vibration of the machine body 2 relatively match each other, the controller 21 compares the first vibration information with the second vibration information corresponding to the first vibration information in terms of time. Specifically, the controller 21 compares the first vibration information and the second vibration information closest in time to each other based on their timestamps. The controller 21 extracts, based on the timestamp of the first vibration information, the second vibration information with the timestamp closest in time to the timestamp of the first vibration information from the storing unit 21*a*.

The controller 21 calculates the difference between the indicator of the first vibration information and the indicator of the second vibration information, and, if the difference is less than a threshold, determines that the vibration of the attachment 30 and the vibration of the machine body 2 relatively match each other.

The controller 21 acquires, as the second vibration information, information which corresponds to the first vibration information included in the advertisement signal Q1 and which indicates the vibration of the machine body 2. For example, in a case that the first vibration information includes a first vibration indicator, the second vibration information includes a fourth vibration indicator (numerical value) indicating the magnitude (strength) of the vibration of the machine body 2 detected by the second vibration sensor 65. The controller 21 compares the first vibration indicator and the fourth vibration indicator and determines whether the fourth selection condition is satisfied.

The controller 21 is configured or programmed to, in the first selecting process, if the difference between the first vibration indicator and the fourth vibration indicator is less than a first strength difference e1, determine that the fourth selection condition of the first condition is satisfied. On the other hand, the controller 21 is configured or programmed to, in the second selecting process, if the difference between the first vibration indicator and the fourth vibration indicator is less than a second strength difference e2, determine that the fourth selection condition of the second condition is satisfied. The second strength difference e2 is defined to be at least smaller than the first strength difference e1 ($e2<e1$).

In a case that the first vibration information includes the second vibration indicator, the second vibration information includes a fifth vibration indicator indicating the frequency of occurrence of vibration (frequency of vibration occurrence) of the machine body 2 detected by the second vibration sensor 65. The controller 21 compares the second vibration indicator and the fifth vibration indicator to determine whether the fourth selection condition is satisfied.

The controller 21 is configured or programmed to, in the first selecting process, if the difference between the second vibration indicator and the fifth vibration indicator is less than a first frequency difference f1, determine that the fourth selection condition of the first condition is satisfied. On the other hand, the controller 21 is configured or programmed to, in the second selecting process, if the difference between the second vibration indicator and the fifth vibration indicator is less than a second frequency difference f2, determine that the fourth selection condition of the second condition is satisfied. The second frequency difference f2 is defined to be at least smaller than the first frequency difference f1 ($f2<f1$).

In a case that the first vibration information includes the third vibration indicator, the second vibration information includes a sixth vibration indicator indicating the duration (vibration duration) of vibration of the machine body 2 detected by the second vibration sensor 65. The controller 21 compares the third vibration indicator and the sixth vibration indicator to determine whether the fourth selection condition is satisfied.

The controller 21 is configured or programmed to, in the first selecting process, if the difference between the third vibration indicator and the sixth vibration indicator is less than a first duration difference g1, determine that the fourth selection condition of the first condition is satisfied. On the other hand, the controller 21 is configured or programmed to, in the second selecting process, if the difference between the third vibration indicator and the sixth vibration indicator is less than a second duration difference g2, determine that the fourth selection condition of the second condition is satisfied. The second duration difference g2 is defined to be at least smaller than the first duration difference g1 ($g2<g1$).

If information read from an advertisement signal Q1 includes two or more of the first to third vibration indicators, the controller 21 may determine whether the fourth selection condition is satisfied based on the differences between such indicators and their corresponding ones of the fourth to sixth indicators. That is, the controller 21 may be configured or programmed to determine that the fourth selection condition is satisfied when at least one of the differences satisfies corresponding condition(s), and may be configured or programmed to determine that the fourth selection condition is satisfied when all the differences satisfy corresponding conditions.

At least the second condition of the first and second conditions may include a condition (fifth selection condition) relating to the distance (distance-for-determination) between the position of the machine body 2 and/or the quick hitch 16 (such a position is hereinafter referred to as a "reference position") and the position of the attachment 30 (such a position is hereinafter referred to as an "attachment position"), and the controller 21 may select an attachment ID using such a condition. The distance-for-determination is the horizontal distance between the reference position and the attachment position. The controller 21 selects, as an attachment ID satisfying the fifth selection condition, an attachment ID corresponding to the attachment 30 with a distance-for-determination less than or equal to a predetermined distance. In such a case, the machine body 2 and/or the quick hitch 16 is/are provided with a position detector 66 to detect the position thereof, and the controller 21 acquires the reference position based on the detection result from the position detector 66.

The position detector 66 is provided in or on the machine body 2 and/or the quick hitch 16, receives satellite signal(s) from a satellite positioning system via a GPS antenna, and detects the reference position using the satellite signal(s). In the present example embodiment, the position detector 66 is provided at an upper portion of the cabin 3, and detects the position of the machine body 2 as the reference position. The reference position is the measured position information such as data represented by latitude and longitude and/or data represented by coordinates (X axis, Y axis). Note that the reference position may be the position of the GPS antenna, or may be a position obtained by correcting the position of the GPS antenna to a specific position of the working vehicle 1 using a predetermined arithmetic expression.

The position detector 66 may include an inertial measurement unit (IMU) that includes an acceleration sensor, a gyroscope sensor and/or the like. The position detector 66 may detect tilting information about the machine body 2 (the roll angle, the pitch angle, and the yaw angle) and/or the like via the inertial measurement unit, and correct the reference position based on the tilting information.

Note that the position detector 66 detects the reference position using a satellite positioning system, but the position detector 66 may detect the position of the machine body 2 and/or the quick hitch 16 by a different method, without using a satellite positioning system. For example, the position detector 66 may be configured to detect the reference position based on the result of sensing by sensor(s) (for example, light detection and ranging (LiDAR)) provided on the working vehicle 1 (for example, the machine body 2) and based on map information stored in the storing device 22.

The position detector 66 does not need to be provided on or in the working vehicle 1, and may be provided in or on the portable device 70 communicable with the controller 21 and the controller 21 may be configured or programmed to receive the reference position from the portable device 70.

The working vehicle 1 includes input(s) N to receive input of the positions of a plurality of attachments 30 (attachment positions). The input(s) N includes, for example, the communicator 24, and the communicator 24 receives an attachment position from the external work assistant 80, for example. In the present example embodiment, the communicator 24 receives the attachment position from the work assistant 80 via the portable device 70. With this, the controller 21 can acquire the attachment position. Note that the input(s) N is not limited to the communicator 24. The input(s) N may include, for example, the user interface 25 to receive manual input of the attachment position from the user such as the driver, and may include a storage medium that stores the storage location(s) (attachment position(s)) of attachment(s) 30 in advance.

The work assistant 80 includes, for example, a stationary terminal (server) such as a stationary computer provided externally to the working vehicle 1. The work assistant 80 is, for example, provided at an agricultural machine manufacturer, an agricultural cooperative association, a management company, or the like. In the present example embodiment, the work assistant 80 in the following description is a server, but the work assistant 80 is not limited to a server and may be a computer, a tablet terminal device, or the like. The server 80 stores (manages) management information in which attachment ID(s) and attachment position(s) are associated with each other, in a database. The server 80 acquires the attachment position(s) externally, and manages the attachment position(s) in a database. The attachment position is the measured position information such as data represented by latitude and longitude or data represented by coordinates (X axis, Y axis), similarly to the reference position.

Specifically, for example, the controller 21 acquires an attachment ID from an advertisement signal Q1 received by the beacon scanner 23, and generates management information in which the attachment ID and the reference position are associated with each other. Accordingly, the communicator 24 transmits the management information to the server 80 via the portable device 70. The controller 21 generates management information in which the reference position detected by the position detector 66 when the attachment 30 was detached from the quick hitch 16, and the attachment ID of the recognized attachment 30, are associated with each other. The controller 21 determines that the quick hitch 16 has switched from the second mode to the first mode and the attachment 30 is now allowed to be detached from the quick hitch 16, i.e., the controller 21 determines that the attachment 30 is to be detached at the current position (reference position) of the machine body 2. The controller 21 then acquires the reference position from the position detector 66, and generates management information in which the currently selected attachment ID and the reference position are associated with each other.

Note that, in this case, the reference position used for the generation of management information is not limited to the position detected by the position detector 66 at the point in time when the attachment 30 was detached from the quick hitch 16, and may be the position detected by the position detector 66 before or after the point in time when the attachment 30 was detached from the quick hitch 16.

The controller 21 may be configured or programmed to, in the case where the beacon scanner 23 receives an advertisement signal Q1 from a beacon transmitter 33 of an attachment 30 located in the vicinity of the machine body 2 that is different from the recognized attachment 30, generate management information in which the attachment ID included in the received advertisement signal Q1 and the reference position detected by the position detector 66 are associated with each other. Note that, also in this case, the reference position used for the generation of the management information is not limited to the position detected by the position detector 66 at the point in time when the beacon scanner 23 received the advertisement signal Q1, and may be the position detected by the position detector 66 before or after the point in time when the advertisement signal Q1 was received.

The above description discusses example cases in which the working vehicle 1 (controller 21) transmits management information to the server 80 via the communicator 24, but the source of the management information acquired by the server 80 is not limited to the working vehicle 1. For example, the following configuration may be used: the user interface 25, the portable device 70, and/or the like receive manual input of management information including the attachment 30 and the attachment position thereof, and the server 80 acquires the management information from the user interface 25, the portable device 70, and/or the like.

When the controller 21 acquires the attachment position corresponding to the attachment ID included in the advertisement signal Q1, the controller 21 calculates a distance-for-determination. The controller 21 sends a request for management information corresponding to the attachment ID to the server 80 based on the attachment ID. When the controller 21 acquires the management information from the server 80 via the portable device 70 and the communicator 24, the controller 21 reads the attachment position included in the management information. The controller 21 acquires the current reference position from the position detector 66 and calculates the distance-for-determination from the attachment position and the reference position.

After the controller 21 calculates the distance-for-determination, the controller 21 determines that the fifth selection condition is satisfied if the distance-for-determination is less than or equal to a predetermined distance (distance threshold h). Specifically, in a case that the first condition and the second condition each include the fifth selection condition, in the first selecting process, the controller 21 determines that the fifth selection condition of the first condition is satisfied if the distance-for-determination is less than or equal to a first distance threshold h1. On the other hand, in the second selecting process, the controller 21 determines that the fifth selection condition of the second condition is satisfied if the distance-for-determination is less than or equal to a second distance threshold h2. The second distance threshold h2 is defined to be at least smaller than the first distance threshold h1 ($h2<h1$).

Note that it is only necessary that at least the second condition be stricter than the first condition in terms of the degree of the selection criterion. The first condition and the second condition may each include any combination of the first to fifth selection conditions, and may have its threshold(s) changed. The first condition and the second condition may be such that selection condition(s) included in the second condition is/are not included in the first condition.

The threshold of each selection condition may be the same between the first condition and the second condition, provided that the second condition be stricter than the first condition in terms of the degree of the selection criterion. In such a case, the second condition may be made stricter than the first condition in terms of the degree of the selection criterion using the number of selection conditions included in the first and second conditions. The second condition may be made stricter than the first condition in terms of the degree of the selection criterion by correcting value(s)-for-determination.

The following details the attachment information collecting process. In the case where one or more attachments 30 are present in the vicinity of the working vehicle 1, one or more advertisement signals Q1 from one or more beacon transmitters 33 of the one or more attachments 30 are received by the beacon scanner 23. Upon receipt of each advertisement signal Q1, the beacon scanner 23 measures the RSSI of the advertisement signal Q1. The controller 21 reads the one or more attachment IDs from the one or more advertisement signals Q1 received by the beacon scanner 23. The controller 21 then cause the storing unit 21*a* to store the one or more attachment IDs read from the one or more advertisement signals Q1 and the RSSI(s) for a first predetermined period of time T1, so that attachment IDs and the RSSIs are collected in the storing unit 21*a*.

In the present example embodiment, in the case where the quick hitch 16 is in the first mode, the controller 21 causes the storing unit 21*a* to store the RSSI of the advertisement signal Q1 received by the beacon scanner 23 and the attachment ID in the advertisement signal Q1. The controller 21 determines, based on the operation state of the attaching switch 26 and the detaching switch 27, whether the quick hitch 16 is in the first mode. In particular, the controller 21 causes the storing unit 21*a* to store the attachment ID(s) that satisfy the first condition among the attachment ID(s) included in the advertisement signal(s) Q1 received by the beacon scanner 23.

Figure 6:
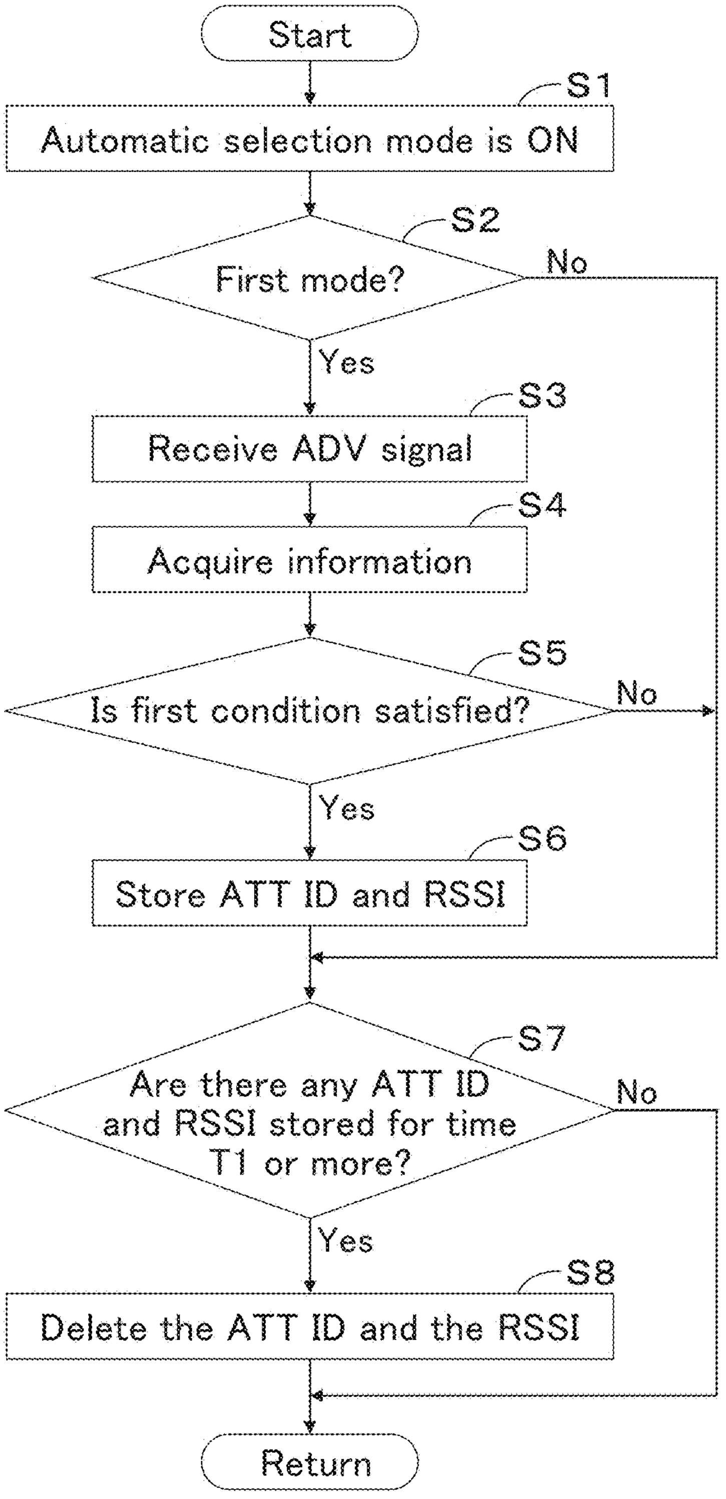
FIG. 6 is a flowchart showing an example of an attachment information collecting process.

FIG. 6 is a flowchart showing an example of an attachment information collecting process. The attachment information collecting process is performed by the controller 21 of the working vehicle 1 based on software program(s) stored in the storing unit 21*a* or the storing device 22. The same applies to a securing-of-attachment recognizing process (described later). In FIG. 6, the advertisement signal Q1 is referred to as "ADV signal" and the attachment is referred to as "ATT" for convenience of description. The same applies to FIGS. 8 and 10 to 13 (described later).

In the case where the automatic selection mode is selected (S1 in FIG. 6), the controller 21 determines whether the quick hitch 16 is in the first mode (S2). If the controller 21 determines that the quick hitch 16 is in the first mode (YES at S2), upon receipt of an advertisement signal Q1 from the beacon transmitter 33 by the beacon scanner 23 (S3), the controller 21 acquires pieces of information in the advertisement signal Q1 from the beacon scanner 23 (S4).

Next, the controller 21 reads the acquired pieces of information, and determines whether the attachment ID included in the advertisement signal Q1 satisfies a first condition (S5). For example, in a case that the first condition includes first and/or second selection condition(s), the controller 21 acquires the RSSI of the advertisement signal Q1 from the beacon scanner 23 and, if the RSSI is higher than a first signal threshold a1, the controller 21 determines that the first selection condition is satisfied and reads information from the received advertisement signal Q1. Next, if the information read from the advertisement signal Q1 includes first vibration information indicating that the attachment 30 is vibrating, the controller 21 determines that there is vibration on the attachment 30 and that the second selection condition is satisfied.

Next, if the controller 21 determines that the attachment ID included in the advertisement signal Q1 satisfies the first condition (YES at S5), the controller 21 causes the storing unit 21*a* to store the attachment ID included in the received advertisement signal Q1 and the RSSI of the advertisement signal Q1 such that the attachment ID and the RSSI are associated with each other (S6). With this, the controller 21 causes the storing unit 21*a* to store attachment ID(s) satisfying the first condition. It is noted here that the controller 21 may cause the storing unit 21*a* to store, for example, the time at which the attachment ID and the RSSI were stored and a beacon ID and/or other information included in the received advertisement signal Q1 such that they are associated with the attachment ID and the RSSI.

In contrast, if the controller 21 determines that the attachment ID included in the advertisement signal Q1 does not satisfy the first condition (NO at S5), the controller 21 does not cause the storing unit 21*a* to store the attachment ID included in the received advertisement signal Q1 or the RSSI of the advertisement signal Q1.

If any of the attachment ID(s) or RSSI(s) in the storing unit 21*a* has been stored for the first predetermined period of time T1 or more (YES in S7), the controller 21 deletes that attachment ID(s) and RSSI(s) from the storing unit 21*a* (S8). It is noted here that the controller 21 also deletes, from the storing unit 21*a*, other information (such as time information) corresponding to the attachment ID(s) having been stored for the first predetermined period of time T1 or more. After step S8, the controller 21 repeats step S1 and subsequent steps.

Figure 7:
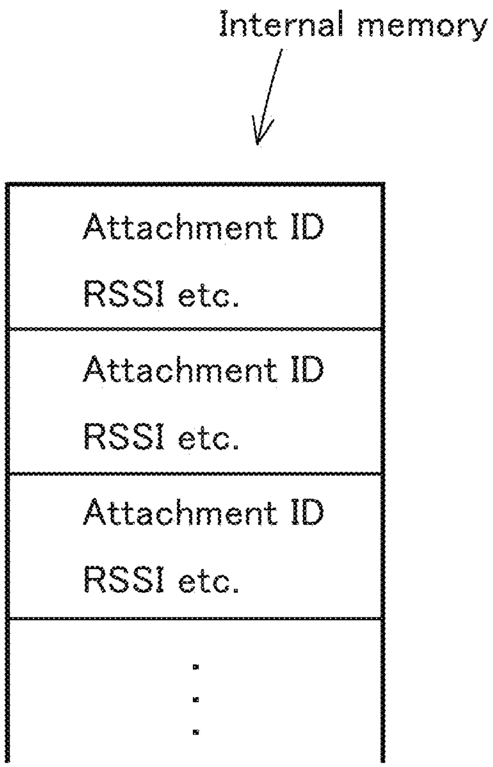
FIG. 7 is a diagram showing an example of information stored in an internal memory of a controller.

FIG. 7 shows information stored in the storing unit 21*a* of the controller 21. The controller 21 repeats the attachment information collecting process shown in FIG. 6, so that attachment IDs satisfying the first condition and their corresponding RSSIs are collected in the storing unit 21*a* as shown in FIG. 7.

Specifically, the controller 21 selects one of the advertisement signal(s) Q1 that is received by the beacon scanner 23 from the beacon transmitter 33 on the attachment 30 which is located close to the quick hitch 16 (working vehicle 1) to some extent and which has vibrated when attached to the quick hitch 16. The attachment ID included in the selected advertisement signal Q1 and the RSSI of that advertisement signal Q1 are stored (collected) in the storing unit 21*a* of the controller 21 for the first predetermined period of time T1. For another example, the controller 21 may cause the storing device 22 to store the attachment ID and the RSSI of the advertisement signal Q1 for the first predetermined period of time T1.

When an attachment 30 placed on the ground or the like is to be attached to the working vehicle 1, the user of the working vehicle 1 operates the traveling device 5 and/or the working device 4 using the manual operator(s) 6 and/or 7 to allow the front plates 50*f* of the brackets 50 of the quick hitch 16 to engage with the base plate 71 of the attachment 30, thus holding the attachment 30 with the brackets 50 (see FIG. 16A). In so doing, in some cases, the user allows the front plates 50*f* to engage with the base plate 71 and then allow the arms 11 and/or the quick hitch 16 to swing upward by a predetermined angle using the work operator 7 to raise the attachment 30 with the working device 4 to some extent to check whether the attachment 30 is held by the brackets 50.

Then, if the user operates the attaching switch 26 for the fifth predetermined period of time T5 or more, the controller 21 causes the latch cylinder 52 to extend. With this, the latch levers 57 pivot downward, so that the latch pins 54 are inserted into the through-holes 71*h* of the base plate 71 of the attachment 30 to allow the attachment 30 to be latched by the latching mechanisms 51 (see FIG. 16B). That is, the attachment 30 is brought into a state in which it is attached to the quick hitch 16 and the working vehicle 1.

During the steps of attaching the attachment 30 described above, the attachment 30 vibrates, for example, when the front plates 50*f* of the brackets 50 are brought into engagement with the base plate 71 of the attachment 30, when the attachment 30 is raised by the working device 4, and/or when the attachment 30 is latched by the latching mechanisms 51. The advertisement signal Q1 transmitted by the beacon transmitter 33 includes first vibration information relating to the vibration state of the attachment 30 that has been detected by the first vibration sensor 34 at any of the above-listed points in time.

Figure 8:
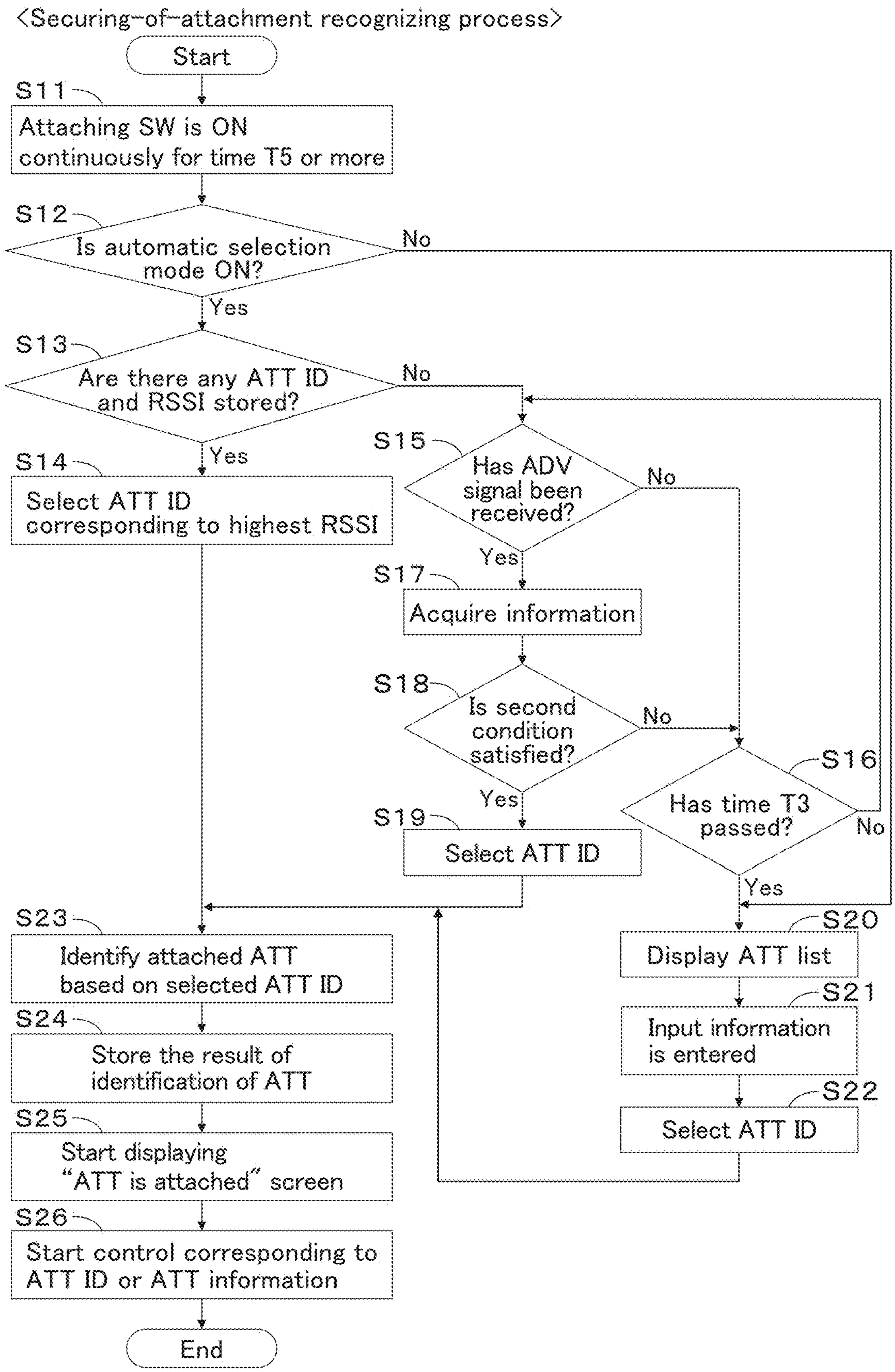
FIG. 8 is a flowchart showing an example of a securing-of-attachment recognizing process.

FIG. 8 is a flowchart showing an example of the securing-of-attachment recognizing process. If the attaching switch 26 is operated continuously (continues to be in ON state) for a fifth predetermined period of time T5 or more (S11 in FIG. 8) as described earlier, the controller 21 determines that the quick hitch 16 is switched from the first mode to the second mode and the attachment 30 is attached to (secured to) the quick hitch 16. Next, in the case where the automatic selection mode is selected (YES in S12), the controller 21 determines whether or not any attachment IDs are stored in the storing unit 21*a* (S13).

If the storing unit 21*a* stores one or more attachment IDs and corresponding one or more RSSIs therein (YES in S13), since attachment ID(s) satisfying the first condition is/are stored in the storing unit 21*a* in the attachment information collecting process in FIG. 6, the controller 21 performs a first selecting process in which the controller 21 reads the one or more RSSIs and the one or more attachment IDs stored in the storing unit 21*a* and selects one of the one or more attachment IDs that corresponds to the highest one of the RSSIs (S14).

The one of the one or more advertisement signals Q1 received by the beacon scanner 23 that has the highest RSSI is a signal transmitted from the beacon transmitter 33 located closest to the beacon scanner 23. Therefore, the controller 21 regards, as the attachment ID of the attachment 30 attached to the quick hitch 16, the attachment ID included in an advertisement signal Q1 having the highest RSSI of advertisement signals Q1 received by the beacon scanner 23 during the first predetermined period of time T1 which ended when the attachment 30 was attached to the quick hitch 16, and selects that attachment ID. Next, the controller 21 identifies the type, other specifications, and/or the like of the attachment 30 attached to the quick hitch 16 based on the selected attachment ID.

On the other hand, if no attachments ID or RSSIs are stored in the storing unit 21*a* (NO at S13), the controller 21 determines that no attachment IDs satisfying the first condition are stored, and determines whether an advertisement signal Q1 from a beacon transmitter 33 has been received by the beacon scanner 23. For example, if an advertisement signal Q1 is received by the beacon scanner 23 (YES at S15) during a third predetermined period of time T3 (NO at S16) which starts when (i.e., before a third predetermined period of time T3 has passed since) the attaching switch 26 has been operated continuously for a fifth predetermined period of time T5 or more (S11), the controller 21 acquires pieces of information in the advertisement signal Q1 from the beacon scanner 23 (S17).

The controller 21 reads the acquired pieces of information and determines whether the attachment ID included in the advertisement signal Q1 satisfies the second condition (S18). For example, in the case where the second condition includes the first and the second selection conditions, the controller 21 acquires the RSSI of the advertisement signal Q1 from the beacon scanner 23, and, if the RSSI is greater than a second signal threshold a2, the controller 21 determines that the first selection condition is satisfied and reads information included in the received advertisement signal Q1. Next, if the information read from the advertisement signal Q1 includes first vibration information indicating that the attachment 30 is vibrating, the controller 21 determines that there is vibration on the attachment 30 and determines that the second selection condition is satisfied.

Then, in the case where the controller 21 determines that the attachment ID included in the advertisement signal Q1 satisfies the second condition, the controller 21 selects the attachment ID that satisfies the second condition (S19) That is, in the present example embodiment, the controller 21 selects the attachment ID corresponding to the advertisement signal Q1 with an RSSI greater than the second signal threshold a2 that includes the first vibration information.

On the other hand, if the controller 21 determines that the attachment ID included in the received advertisement signal Q1 does not satisfy the second condition (NO at S18), the controller 21 proceeds to step S16. Note that, if a third predetermined period of time T3 has passed (YES at S16) after the attaching switch 26 has been operated continuously for a fifth predetermined period of time T5 or more (S11), the controller 21 causes the user interface 25 to display the attachment list L1 including a plurality of attachments 30 attachable to the quick hitch 16 (S20).

The user such as the driver inputs the information (input information) indicating the attachment 30 attached to the quick hitch 16 using the attachment list L1 via the user interface 25 (S21). With this, the controller 21 selects the attachment ID of the attachment 30 indicated by the input information inputted via the user interface 25 (S22). In such a manner, the controller 21 identifies the attachment 30 attached to the quick hitch 16 based on the input information. Also in the case where the manual selection mode is active instead of the automatic selection mode (NO at S12) when the attaching switch 26 has been operated continuously for a fifth predetermined period of time T5 or more (S11), the controller 21 causes the user interface 25 to display the attachment list L1 (S20). The controller 21 selects an attachment ID via the foregoing process of S21 (S22).

Next, after selecting the attachment ID (S14, S19, S22), the controller 21 identifies (recognizes) the attachment 30 attached to the quick hitch 16 based on the selected attachment ID (S23). The controller 21 causes the storing device 22 to store the result of identification of the attachment 30 (S24). It is noted here that the controller 21 causes the storing device 22 to store information indicating that the identified attachment 30 is attached to the quick hitch 16, i.e., to the working vehicle 1, and the attachment ID of the attached attachment 30.

The controller 21 starts a display process (predetermined process) in which the controller 21 causes the user interface 25 to display (output) an "attachment is attached" screen G1 which indicates that the attachment 30 corresponding to the selected attachment ID is attached and which displays attachment information relating to the attached attachment 30 (S25).

Figure 9:
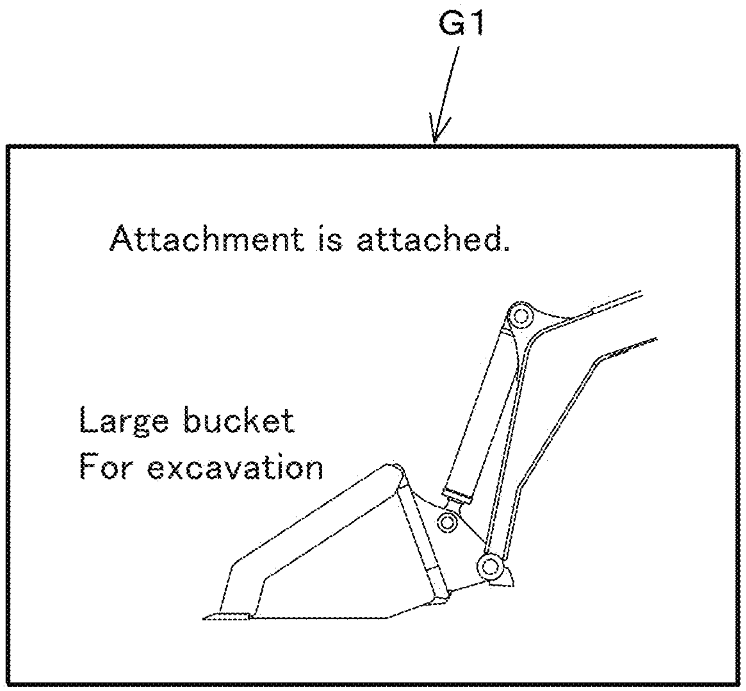
FIG. 9 illustrates an example of an "attachment is attached" screen.
Figure 10:
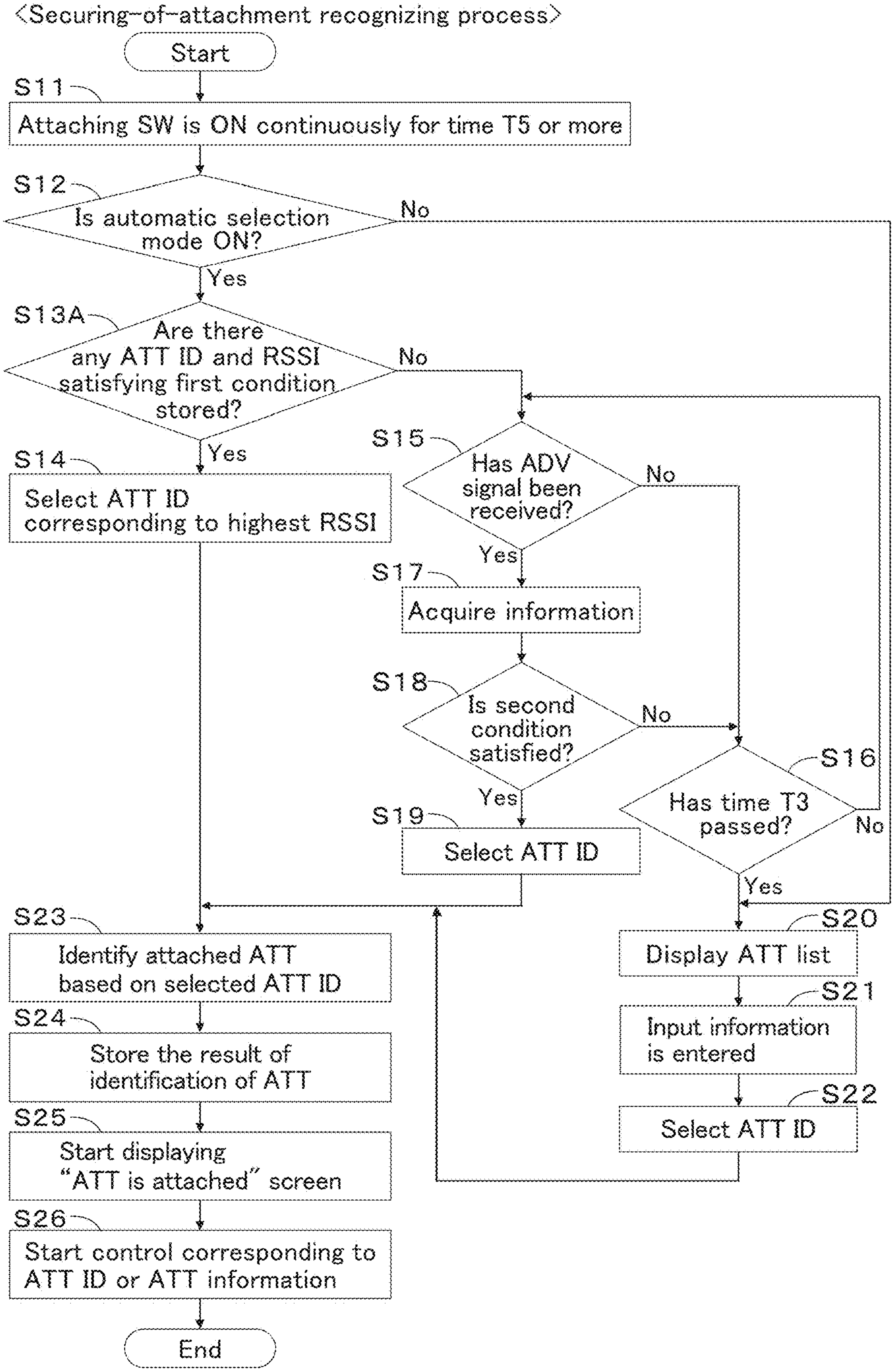
FIG. 10 is a flowchart showing another example of a securing-of-attachment recognizing process.

FIG. 9 illustrates an example of the "attachment is attached" screen G1. The "attachment is attached" screen G1 displays a message indicating that the attachment 30 is attached, the attachment information relating to the attached attachment 30, and an icon of the attachment 30. In the example in FIG. 9, the attachment information "Large bucket" "for excavation" is displayed. Additionally or alternatively, other attachment information such as the attachment ID, size, and/or manufacturer of the attachment 30 may be displayed. The display data for the "attachment is attached" screen G1 and the attachment information are prestored in the storing device 22.

For another example, the controller 21 may cause the communicator 24 (FIG. 1) to transmit, to the portable device 70, the display data for the "attachment is attached" screen G1 and the attachment information of the attachment 30 which has been determined as being attached so that the "attachment is attached" screen G1 is displayed on a display of the portable device 70.

The controller 21 starts predetermined control (predetermined process) according to the attachment ID selected in step S14, S19, S22 (S26). In so doing, the controller 21 reads control data corresponding to the selected attachment ID form the storing device 22 and starts control corresponding to the attachment 30 attached to the quick hitch 16 based on the control data.

Specifically, in the case where the attachment 30 attached to the quick hitch 16 is an attachment 30*b* including a hydraulic actuator 36 such as a skid cutter, the controller 21 starts causing the control valve 40*d* to control the output of hydraulic fluid from the hydraulic fluid outlet port 18*a* to the attachment 30*b*, based on the control data read from the storing device 22. With this, draining of return fluid to be introduced from the attachment 30*b* into the hydraulic fluid inlet port 18*b* is also started. The controller 21 may, for example, cause the "attachment is attached" screen G1 to display a message indicating that the control of the output of hydraulic fluid to the attachment 30*b* has been started.

Note that, in the case where the attachment 30 attached to the quick hitch 16 is an attachment 30 including no hydraulic actuators such as a bucket 30*a*, the controller 21 does not cause the control valve 40*d* to output hydraulic fluid from the hydraulic fluid outlet port 18*a* to the attachment 30 based on the control data read from the storing device 22. The controller 21 may start control such as adjusting and/or limiting the travel speed and/or speed stage of the working vehicle 1 and/or the height of the raised/lowered arms 11 according to the selected attachment ID in step S18.

Note that the attachment information collecting process shown in the above mentioned FIG. 6, and the securing-of-attachment recognizing process shown the above mentioned FIG. 8, are merely examples and that this does not imply any limitation. For example, in the attachment information collecting process discussed using FIG. 6, in the case where the quick hitch 16 is in the first mode, the controller 21 causes the storing unit 21*a* to store the RSSI of the advertisement signal Q1 received by the beacon scanner 23 and the attachment ID in the received advertisement signal Q1. However, the controller 21 may be configured or programmed to, when the quick hitch 16 is not in the first mode, cause the storing unit 21*a* to store the RSSI of the advertisement signal Q1 received by the beacon scanner 23 and the attachment ID in the received advertisement signal Q1. For example, the controller 21 may be configured or programmed to, while the quick hitch 16 is shifting from the second mode to the first mode, cause the storing unit 21*a* to store the RSSI of the advertisement signal Q1 received by the beacon scanner 23 and the attachment ID in the received advertisement signal Q1.

In the first selecting process, the controller 21 need only select the attachment ID included in the advertisement signal Q1 with the highest RSSI that satisfies the first condition. That is, in the attachment information collecting process shown in FIG. 6, the controller 21 causes the storing unit 21*a* to store the attachment ID(s) satisfying the first condition, but the controller 21 may determine whether the first condition is satisfied in the securing-of-attachment recognizing process.

In this variation, in the attachment information collecting process in FIG. 6, after step S4, the controller 21 skips step S5 and proceeds to step S6. In the variation, since step S5 of the attachment information collecting process is skipped, the controller 21 determines whether attachment ID(s) satisfying the first condition is/are stored in the storing unit 21*a* (S13A) as shown in another example of the securing-of-attachment recognizing process in FIG. 10, instead of step S13 in FIG. 8.

Then, if at least one attachment ID satisfying the first condition and at least one RSSI corresponding to the attachment ID are stored in the storing unit 21*a* (YES at S13A), the controller 21 proceeds to the first selecting process of S14. On the other hand, if no attachment IDs satisfying the first condition or RSSIs are stored in the storing unit 21*a* (NO at S13A), the controller 21 determines that no attachment IDs satisfying the first condition are stored, and proceeds to step S15.

Figure 11:
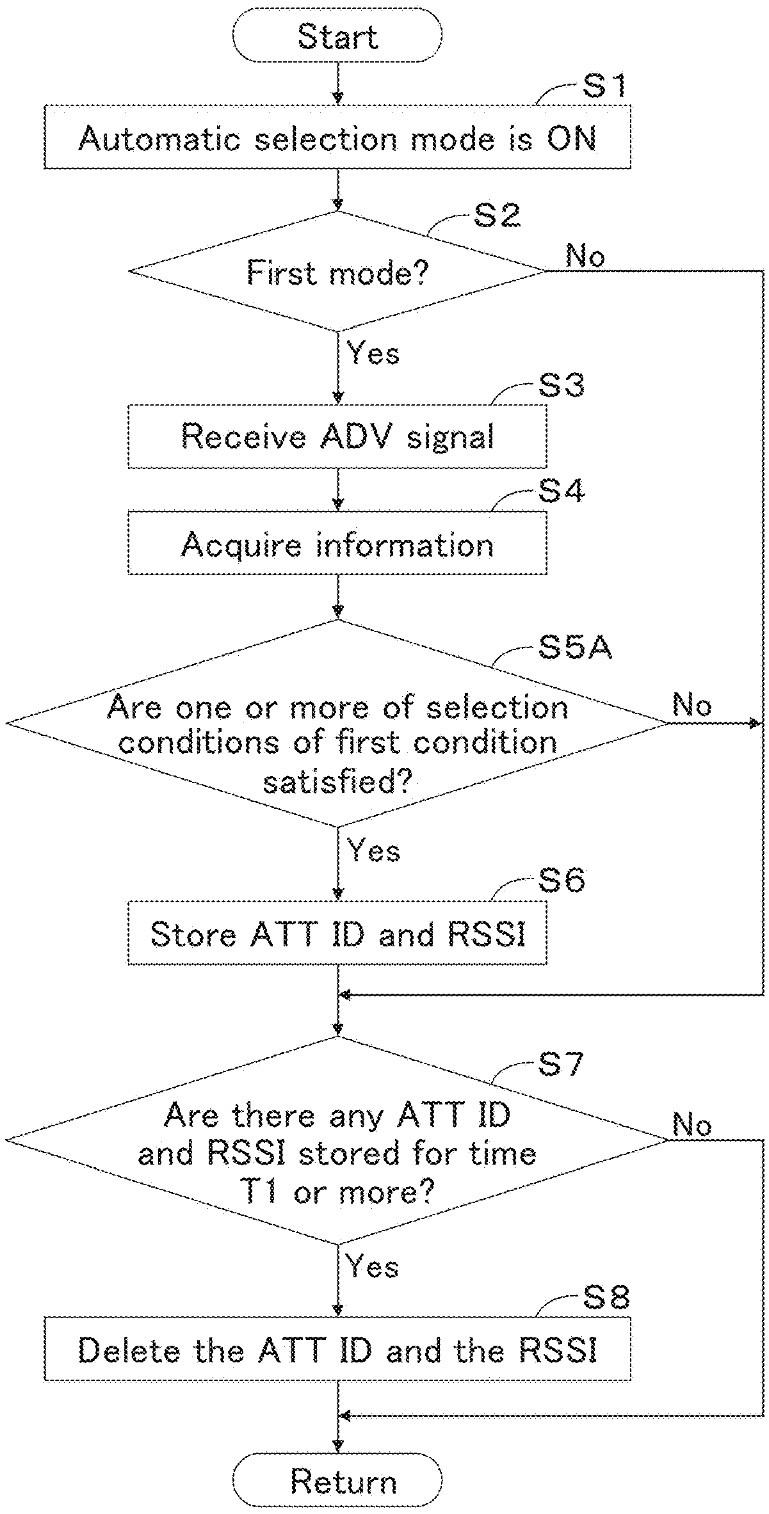
FIG. 11 is a flowchart showing an example of an attachment information collecting process.
Figure 12:
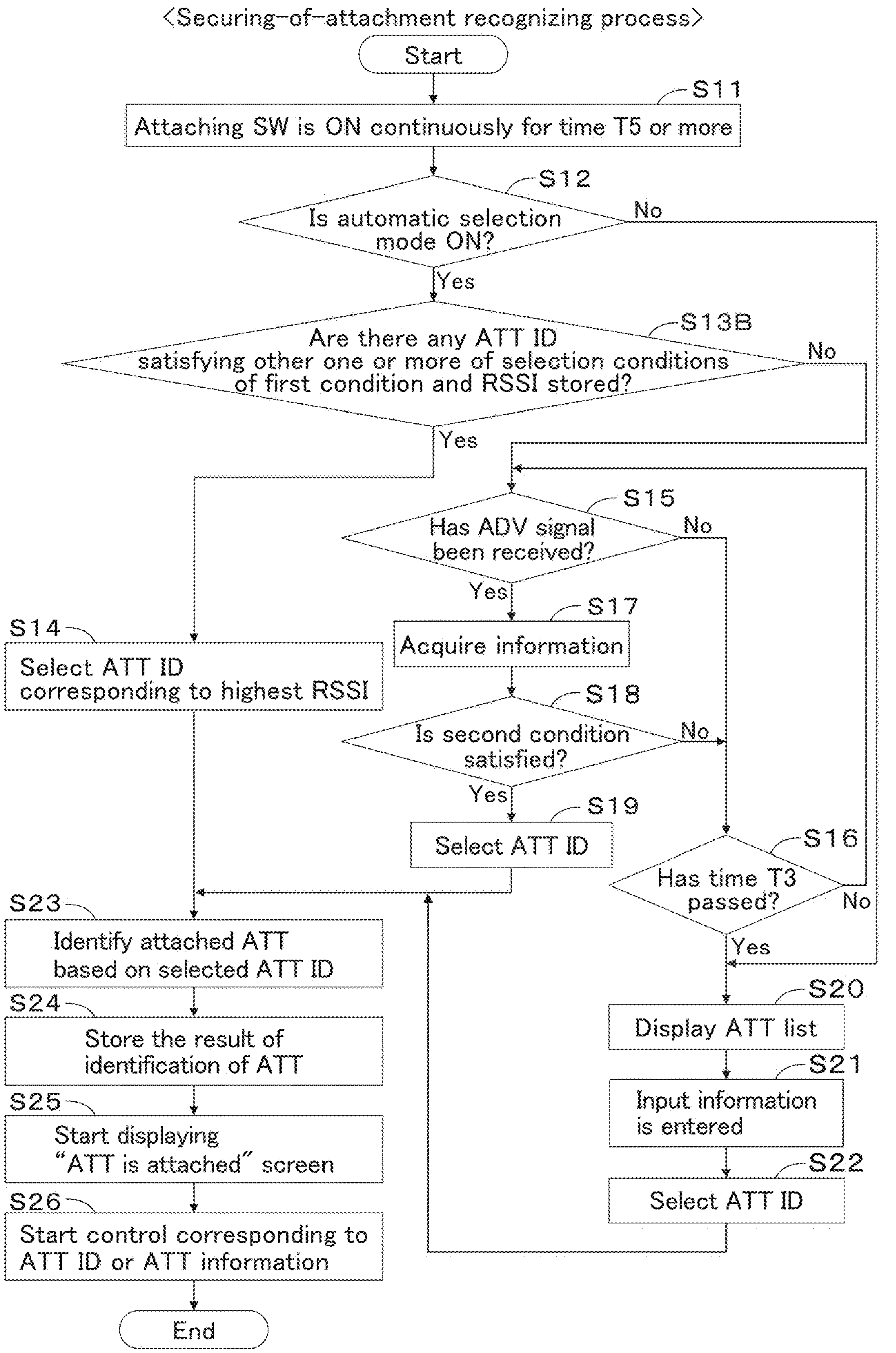
FIG. 12 is a flowchart showing another example of a securing-of-attachment recognizing process.

Furthermore, in the case where the first condition includes a plurality of selection conditions, the controller 21 may be configured or programmed to, (i) in the attachment information collecting process shown in FIG. 11, determine whether one or more of the selection conditions included in the first condition are satisfied (S5A) instead of step S5, and (ii) in the securing-of-attachment recognizing process shown in FIG. 12, determine whether attachment ID(s) satisfying the other one or more of the selection conditions included in the first condition is/are stored in the storing unit 21*a* (S13B) instead of step S13A. Specifically, as shown in another example of the attachment information collecting process shown in FIG. 11, after step S4, the controller 21 determines whether the attachment ID included in the advertisement signal Q1 satisfies one or more of the selection conditions included in the first condition (S5A). In the case where the controller 21 determines that the attachment ID included in the advertisement signal Q1 satisfies the one or more of the selection conditions (YES at S5A), the controller 21 causes the storing unit 21*a* to store the attachment ID included in the received advertisement signal Q1 and the RSSI of the advertisement signal Q1 such that they are associated with each other (S6). On the other hand, if the controller 21 determines that the attachment ID included in the advertisement signal Q1 does not satisfy the one or more of the selection conditions (NO at S5A), the controller 21 does not cause the storing unit 21*a* to store the attachment ID included in the received advertisement signal Q1 or the RSSI of the advertisement signal Q1.

As shown in another example of the securing-of-attachment recognizing process shown in FIG. 12, after step S12, the controller 21 determines whether attachment ID(s) satisfying the other one or more of the selection conditions included in the first condition is/are stored in the storing unit 21*a* (S13B). Then, if the controller 21 determines that at least one attachment ID satisfying the other one or more of the selection conditions and at least one RSSI corresponding to the attachment ID are stored in the storing unit 21*a* (YES at S13B), the controller 21 proceeds to the first selecting process at S14. On the other hand, if no attachment IDs satisfying the other one or more of the selection conditions or RSSIs are stored in the storing unit 21*a* (NO at S13B), the controller 21 determines that no attachment IDs satisfying the first condition are stored, and proceeds to step S15.

The above description discusses example embodiments in which, in the second selecting process, the controller 21 selects the attachment ID satisfying the second condition from the attachment ID(s) included in the advertisement signal(s) Q1 received by the beacon scanner 23 after the attachment 30 is attached to the quick hitch 16 (after the quick hitch 16 changes from the first mode to the second mode). However, in the second selecting process, the controller 21 need only select an attachment ID satisfying a predetermined second condition from the attachment ID(s) included in one or more advertisement signals Q1 received by the beacon scanner 23 at least after the attachment 30 is attached to the quick hitch 16. For example, the controller 21 may refer to an advertisement signal Q1 which is not an advertisement signal Q1 newly received by the beacon scanner 23 after the attachment 30 is attached to the quick hitch 16 and before the second selecting process is performed.

Specifically, when the beacon scanner 23 receives an advertisement signal Q1 while the controller 21 is performing the first selecting process, the controller 21 may cause the storing unit 21*a* to also store (retain) the attachment ID, and may refer to the attachment ID stored in the storing unit 21*a* in the second selecting process. In this case, while the controller 21 is performing the first selecting process, the controller 21 does not refer to the attachment ID in the advertisement signal Q1 newly received by the beacon scanner 23, but refers to the attachment ID that was stored in the storing unit 21*a* before the attachment 30 was attached to the quick hitch 16.

Alternatively, for example, the controller 21 may be configured or programmed to select the attachment ID satisfying the second condition from the attachment ID(s) included in one or more advertisement signals Q1 that were received by the beacon scanner 23 after the driver M started to be driven after the attachment 30 was attached to the quick hitch 16. In such a case, in the case where the controller 21 performs the second selecting process instead of the first selecting process, even after the attachment 30 is attached to the quick hitch 16, the controller 21 does not select the attachment ID included in the advertisement signal Q1 received by the beacon scanner 23 before the driver M starts to be driven.

Specifically, in the second selecting process, the controller 21 selects the attachment ID satisfying the second condition from the attachment ID(s) included in one or more advertisement signals Q1 that were received by the beacon scanner 23 during a second predetermined period of time T2 after the attachment 30 was attached to the quick hitch 16 and after the driver M started to be driven. Therefore, in the second selecting process, even after the attachment 30 is attached to the quick hitch 16 and after the driver M starts to be driven, after the second predetermined period of time T2 has passed, the controller 21 does not select the attachment ID included in the advertisement signal Q1 received by the beacon scanner 23.

The driver M includes, for example, at least one of the position changer C or the traveling devices 5. In the present example embodiment, the driver M includes both the position changer C and the traveling devices 5. Note that the driver M is not limited to the position changer C and the traveling devices 5, provided that the driver M is a device that can cause the machine body 2 to vibrate by being driven.

The controller 21 determines whether the driver M is being driven. The second predetermined period of time T2 is defined to be at least shorter than the third predetermined period of time T3. The second predetermined period of time T2 is, for example, about 1 second or 2 seconds.

The controller 21 determines whether the position changer C is being driven based on, for example, the operation of the work operator 7 (pilot pressure from operating valve(s) and/or detection signal(s) from detection sensor(s)). That is, in the case where the work operator 7 is not operated, the controller 21 may determine that the position changer C is not being driven. The controller 21 determines whether the traveling devices 5 are being driven based on, for example, the operation of the travel operator 6 (pilot pressure from operating valve(s) and/or detection signal(s) from detection sensor(s)). That is, in the case where the travel operator 6 is not operated, the controller 21 may determine that the traveling devices 5 are not being driven.

Note that the above described methods of determining whether the driver M is being driven are merely examples, and that this does not imply any limitation. For example, potentiometer(s) may be provided on the shaft at the proximal portion of the arm(s) 11 and/or on the shaft of the proximal portion of the quick hitch 16, stroke sensor(s) may be provided on the arm cylinder(s) 14 and/or the front cylinder(s) 15, and/or acceleration sensor(s) may be provided on the arm(s) 11 and/or the quick hitch 16, and the controller 21 may determine whether the position changer C is being driven based on detection results from such devices. The controller 21 may determine whether the traveling devices 5 are being driven based on the vehicle speed of the machine body 2 and/or changes in the reference position detected by the position detector 66.

Figure 13:
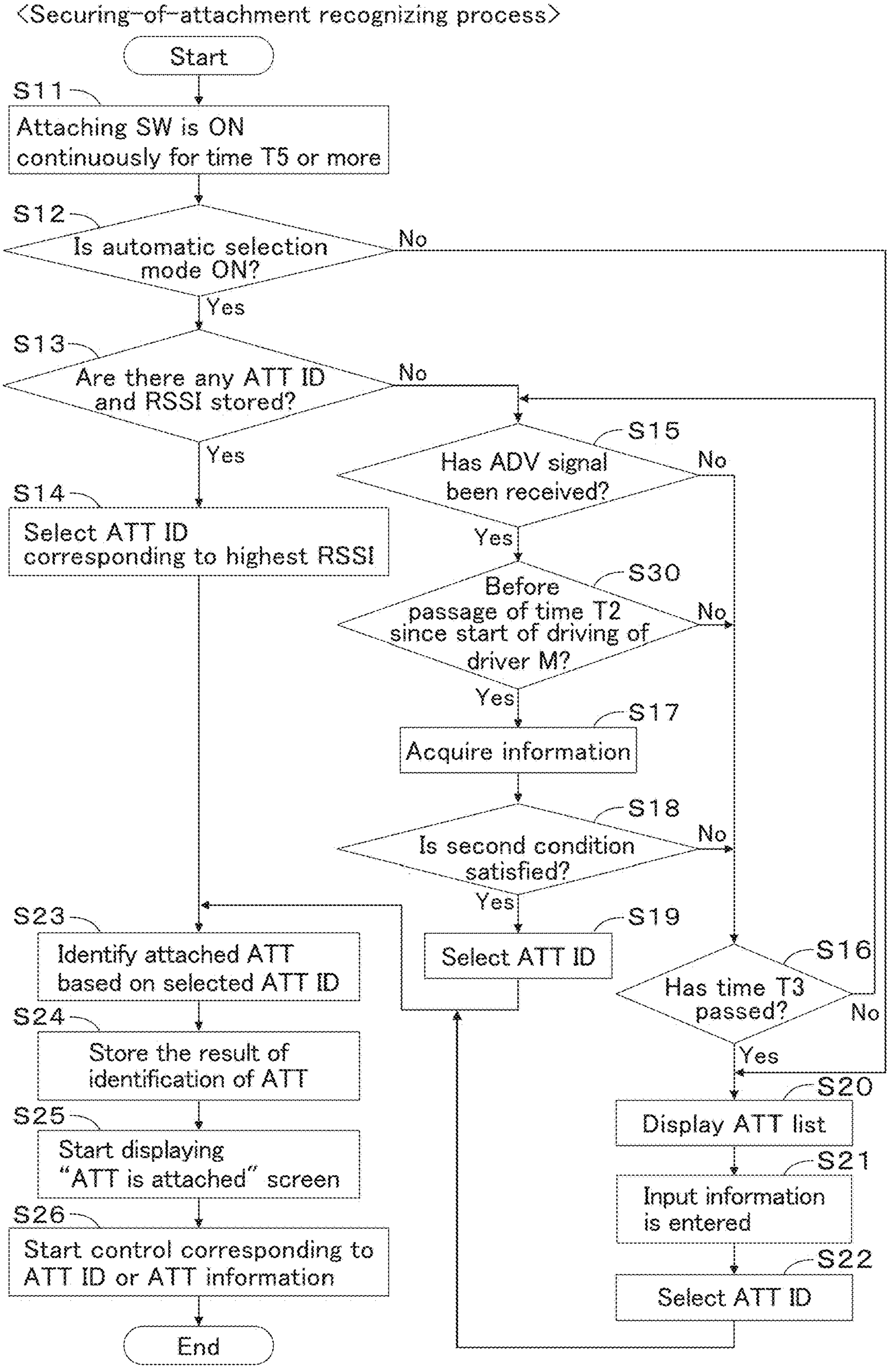
FIG. 13 is a flowchart showing another example of a securing-of-attachment recognizing process.

In the securing-of-attachment recognizing process shown in FIG. 13, when an advertisement signal Q1 is received by the beacon scanner 23 (YES at S15), the controller 21 determines whether the second predetermined period of time T2 has passed since the driver M started to be driven (S30). If the controller 21 determines that the second predetermined period of time T2 has not passed since the driver M started being driven (before the passage of the second predetermined period of time T2 since the start of the driving of the driver M) (YES at S30), the controller 21 proceeds to step S17. On the other hand, at step S30, if the controller 21 does not determine that the second predetermined period of time T2 has not passed since the driver M started being driven, i.e., if the controller 21 determines that the second predetermined period of time T2 or more has passed since the driver M started being driven (NO at S30), the controller 21 proceeds to step S16.

Note that the above description about the example shown in FIG. 13 discusses cases in which the controller 21 refers to the attachment ID in an advertisement signal Q1 that is received by the beacon scanner 23 after the controller 21 starts a second selecting process and the driver M starts to be driven, but the controller 21 need only refer to the attachment ID included in an advertisement signal Q1 that is received by the beacon scanner 23 at least after the driver M starts to be driven after the attachment 30 is attached to the quick hitch 16. Specifically, even while the controller 21 is performing the first selecting process, if the beacon scanner 23 receives an advertisement signal after the driver M starts to be driven, the controller 21 may cause the storing unit 21*a* to store (retain) also the attachment ID, and in the second selecting process, the controller 21 may refer to the attachment ID stored in the storing unit 21*a*.

In the above-described example embodiments, each attachment 30 is provided with a beacon transmitter 33 to transmit a wireless signal (advertisement signal Q1) compliant with Bluetooth (registered trademark) Low Energy, and the working vehicle 1 is provided with a beacon scanner 23 to receive the wireless signals. However, additionally or alternatively, for example, the attachment 30 may be provided with a transmitter 33 such as a radio frequency identification (RFID) tag, and the working vehicle 1 may be provided with a receiver 23 to receive wireless signals transmitted from the RFID. Additionally or alternatively, the attachment 30 may be provided with a transmitter 33 to transmit radio waves for some other near field communication, and the working vehicle 1 may be provided with a receiver 23 to receive the radio waves.

In the above-described example embodiments, the working vehicle 1 is provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the user manually attaches the attachment 30 to the hitch or manually detaches the attachment 30 from the hitch, the user may input information indicating that the attachment 30 is attached or detached using the user interface 25.

In the above-described example embodiments, the user inputs attachment information relating to the attachment 30 attached to the quick hitch 16 using the user interface 25 provided in or on the working vehicle 1. However, for example, the user may input attachment information relating to the attachment 30 attached to the quick hitch 16 using a portable device 70. That is, the portable device 70 may be used as a user interface instead of the user interface 25.

In such a case, upon input of attachment information into the portable device 70, the portable device 70 transmits the attachment information to the communicator 24 of the working vehicle 1 via the Internet and/or the like. Upon receipt of the attachment information by the communicator 24, the controller 21 of the working vehicle 1 recognizes the attachment 30 attached to the quick hitch 16 based on the attachment ID included in the attachment information.

In the above-described example embodiments, the working device 4, the quick hitch 16, and the specific attachment 30*b* are provided with hydraulic actuators (such as the arm cylinders 14, the front cylinders 15, and the latch cylinder 52). Additionally or alternatively, the working device 4, the quick hitch 16, and the specific attachment may be provided with electric actuators. In the case where an attachment 30 including an electric actuator is attached to the quick hitch 16, the controller 21 may output, as power for the electric actuator, electricity (power) from the battery 20 (FIG. 1) to the attachment 30 via an external electric wire based on control data corresponding to the attachment 30.

An attachment 30 including a work member to be actuated by power from the prime mover 9 of the working vehicle 1 may be attached to the quick hitch 16. In the case where such an attachment 30 including a work member is attached to the quick hitch 16, the controller 21 may output power from the prime mover 9 to the attachment 30 via a power transmission mechanism including gear(s), shaft(s), and/or the like based on control data corresponding to the attachment 30.

Example embodiments of the present invention provide working vehicles 1 and attachment usage systems 100 described in the following items.

(Item 1) A working vehicle 1 including a linkage 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select a piece of identification information of the attachment 30 attached to the linkage 16 from the one or more pieces of identification information included in the one or more wireless signals Q1 received by the receiver 23, and start a predetermined process based on the selected piece of identification information, wherein the controller 21 is configured or programmed to cause a memory and/or storage 21*a* to store, for a first predetermined period of time T1, the one or more pieces of identification information included in the one or more wireless signals Q1 received by the receiver 23, and when the attachment 30 is attached to the linkage 16, perform a first selecting process to select a piece of identification information satisfying a first condition from the one or more pieces of identification information stored in the memory and/or storage 21*a*, and, if the memory and/or storage 21*a* stores no identification information satisfying the first condition, perform a second selecting process to select a piece of identification information satisfying a second condition from one or more pieces of identification information included in one or more wireless signals Q1 received by the receiver 23 after the attachment 30 is attached to the linkage 16.

With the working vehicle 1 according to item 1, the controller 21 is configured or programmed to, upon each receipt by the receiver 23 of a wireless signal Q1 transmitted one-way from a transmitter 33, cause the memory and/or storage (storing unit) 21*a* to store the piece of identification information included in that wireless signal Q1, and, when an attachment 30 is attached to the linkage 16, select a piece of identification information of the attached attachment 30 from the storing unit 21*a*. Therefore, the controller 21 does not need to perform complex signal processing each time a wireless signal Q1 is received, making it possible to reduce the processing load on the controller 21. On the other hand, even if the storing unit 21*a* stores no identification information satisfying the first condition, a piece of identification information satisfying the second condition newly received by the receiver 23 is selected, making it possible for the working vehicle 1 to smoothly perform the predetermined process. It follows that it is possible to efficiently use replaceable attachments 30 on the working vehicle 1.

(Item 2) The working vehicle according to item 1, wherein the controller 21 is configured or programmed to, in the second selecting process, if the receiver 23 receives a wireless signal Q1 including a piece of identification information satisfying the second condition, select the piece of identification information included in the wireless signal Q1.

With the working vehicle 1 according to item 2, even if the storing unit 21*a* stores no identification information satisfying the first condition, a predetermined process based on a piece of identification information satisfying the second condition included in a wireless signal Q1 can be started upon receipt of that wireless signal Q1 by the receiver 23. This makes it possible for the working vehicle 1 to more smoothly perform the predetermined process.

(Item 3) The working vehicle 1 according to item 2, wherein the controller 21 is configured or programmed to cause the memory and/or storage 21*a* to store, for the first predetermined period of time T1, one or more received signal strengths of the one or more wireless signals Q1 received by the receiver 23 such that the one or more received signal strengths are associated with the one or more pieces of identification information included in the one or more wireless signals Q1, and in the first selecting process, select, from the one or more pieces of identification information stored in the memory and/or storage 21*a*, a piece of identification information which satisfies the first condition and which is included in a wireless signal Q1 with a highest received signal strength.

With the working vehicle 1 according to item 3, it is possible to select one of the piece(s) of identification information which was/were received in the recent first predetermined period of time T1 and which satisfies/satisfy the first condition that corresponds to the attachment 30 nearest the receiver 23. This makes it possible to perform a predetermined process based on a piece of identification information which satisfies the first condition and which is included in a wireless signal Q1 transmitted from a transmitter 33 in or on an attachment 30 located relatively close to the receiver 23 during the recent first predetermined period of time T1. It is also possible to eliminate or reduce the likelihood that a predetermined process will be performed accidentally based on a piece of identification information that does not satisfy the first condition and/or that is included in a wireless signal Q1 from a transmitter 33 in or on an attachment 30 which may have been located relatively far away during the first predetermined period of time T1.

(Item 4) The working vehicle 1 according to any one of items 1 to 3, wherein the first condition and the second condition differ from each other in a degree of a selection criterion based on which a piece of identification information is selected.

With the working vehicle 1 according to item 4, by adjusting the selection criteria in the first condition and the second condition, it is possible to cause the degree of priority between the accuracy of identifying the attachment 30 and the instant start of a predetermined process in the second selecting process to differ from the first selecting process.

(Item 5) The working vehicle 1 according to item 4, wherein the second condition is stricter than the first condition in the degree of the selection criterion based on which a piece of identification information is selected.

With the working vehicle 1 according to item 5, it is possible to achieve the accuracy of identifying the attachment 30 in the second selecting process.

(Item 6) The working vehicle 1 according to item 5, wherein the first condition and the second condition each include a condition in which the piece of identification information to be selected by the controller 21 is a piece of identification information included in a wireless signal Q1 with a received signal strength higher than a predetermined value.

With the working vehicle 1 according to item 6, since it can be said that a higher received signal strength indicates a shorter distance between the transmitter 33 and the receiver 23 than when the received signal strength is lower, it is possible to improve the accuracy of identifying the attachment 30.

(Item 7) The working vehicle 1 according to item 6, wherein the second condition includes a condition in which the piece of identification information to be selected by the controller 21 is a piece of identification information included in a wireless signal Q1 with a received signal strength greater compared to the first condition.

With the working vehicle 1 according to item 7, it is possible to select an attachment 30 relatively close to the receiver 23 in the second selecting process as compared to the first selecting process. Thus, after an attachment 30 is attached to the linkage 16, i.e., at least in the second selecting process in which the receiver 23 and the attachment 30 are highly likely to be closest to each other, it is possible to achieve the accuracy of identifying the attachment 30.

(Item 8) The working vehicle 1 according to claim 7, further including a machine body 2 to support the linkage 16, and a traveling device 5 to support the machine body 2 such that the machine body 2 is allowed to travel.

The working vehicle 1 according to item 8 achieves the following. In a case that the working vehicle 1 travels using the traveling devices 5 after an attachment 30 is attached to the linkage 16, the attachment 30 moves together with the machine body 2 while being kept close to the receiver 23. Therefore, it possible to appropriately identify the attachment 30 in the second selecting process.

(Item 9) The working vehicle 1 according to any one of items 5 to 8, wherein at least the second condition of the first and second conditions includes a condition in which the piece of identification information to be selected by the controller 21 is a piece of identification information corresponding to a wireless signal Q1 which includes vibration information indicating that a corresponding attachment 30 is vibrating.

With the working vehicle 1 according to item 9, at least in the second selecting process, it is possible to eliminate or reduce the likelihood that a piece of identification information included in a wireless signal Q1 from a transmitter 33 in or on an attachment 30 which is not attached to the linkage 16 and has not vibrated will be selected. This makes it possible, in the second selecting process, to appropriately identify the attachment 30.

(Item 10) The working vehicle 1 according to item 9, wherein the controller 21 is configured or programmed to, based on the vibration information, acquire a value-for-determination indicating at least one of a vibration strength of the corresponding attachment 30, a frequency of vibration occurrence of the corresponding attachment 30, or a vibration duration of the corresponding attachment 30, and the second condition includes a condition in which the piece of identification information to be selected by the controller 21 is a piece of identification information included in a wireless signal Q1 with a value-for-determination greater compared to the first condition.

With the working vehicle 1 according to item 10, it is possible, in the second selecting process, to more reliably select a piece of identification information transmitted from a transmitter 33 in or on an attachment 30 which is attached to the linkage 16 and therefore has vibrated, as compared to the first selecting process. Thus, it is possible to select the piece of identification information of the attachment 30 which is attached to the linkage 16 and which is highly likely to have vibrated as compared to when not attached, making it possible to appropriately identify the attachment 30 in the second selecting process.

(Item 11) The working vehicle 1 according to item 10, further including a machine body 2 to support the linkage

16, and a driver M on the machine body 2 to be driven, wherein the driver M includes at least one of a position changer C to connect the linkage 16 and the machine body 2 and to be driven to change a position of the linkage 16 relative to the machine body 2, or a traveling device 5 to support the machine body 2 and to be driven to impart a propelling force to the machine body 2.

The working vehicle 1 according to item 11 achieves the following. After an attachment 30 is attached to the linkage 16, vibration relatively increases in magnitude as compared to when the attachment 30 is not attached, because the linkage 16 is changed in position by the position changer C or the working vehicle 1 is caused to travel by the traveling devices 5. Thus, it is possible to appropriately identify the attachment 30 in the second selecting process.

(Item 12) The working vehicle 1 according to item 11, wherein the controller 21 is configured or programmed to, in the second selecting process, select a piece of identification information satisfying the second condition from one or more pieces of identification information included in one or more wireless signals Q1 received by the receiver 23 after the attachment 30 is attached to the linkage 16 and after the driver M starts to be driven.

With the working vehicle 1 according to item 12, since the controller 21 selects a piece of identification information included in a wireless signal Q1 received by the receiver 23 after the driver M starts to be driven, it is possible to select the piece of identification information of an attachment 30 which is highly likely to have vibrated due to the driver M.

(Item 13) The working vehicle 1 according to item 12, wherein the controller 21 is configured or programmed to, in the second selecting process, select a piece of identification information satisfying the second condition from one or more pieces of identification information included in one or more wireless signals Q1 received by the receiver 23 during a second predetermined period of time T2 after the attachment 30 is attached to the linkage 16 and after the driver M starts to be driven.

With the working vehicle 1 according to item 13, it is possible to select the piece of identification information of an attachment 30 which is more likely to have vibrated due to the driver M.

(Item 14) The working vehicle 1 according to any one of items 5 to 13, further including a machine body 2 to support the linkage 16, and a vibration detector 65 provided in or on the machine body 2 to detect vibration of the machine body 2, wherein at least the second condition of the first and second conditions includes a condition in which the piece of identification information to be selected by the controller 21 is a piece of identification information corresponding to a wireless signal Q1 including vibration information indicating that there is vibration on a corresponding attachment 30, the vibration on the corresponding attachment 30 relatively matching the vibration of the machine body 2 detected by the vibration detector 65.

With the working vehicle 1 according to item 14, it is possible to eliminate or reduce the likelihood that a predetermined process will be performed based on the piece of identification information of an attachment 30 which vibrates when the machine body 2 is not vibrating, i.e., an attachment 30 which is less likely to be attached to the linkage 16.

(Item 15) The working vehicle 1 according to any one of items 1 to 14, wherein the controller 21 is configured or programmed to end the second selecting process if, in the second selecting process, the second condition is satisfied by none of one or more pieces of identification information included in one or more wireless signals Q1 received by the receiver 23 during a third predetermined period of time T3 starting when the attachment 30 is attached to the linkage 16, and allow a user interface 25 to receive input of information indicating the attachment 30 attached to the linkage 16, and start the predetermined process based on the information received via the user interface 25.

With the working vehicle 1 according to item 15, even if there are no identification information satisfying the second condition in the second selecting process, the user such as the driver can easily select the attachment 30 attached to the linkage 16 manually using the user interface 25. This makes it possible for the working vehicle 1 to more smoothly perform a predetermined process.

(Item 16) The working vehicle 1 according to item 15, wherein the third predetermined period of time T3 differs in duration from the first predetermined period of time T1.

With the working vehicle 1 according to item 16, when the third predetermined period of time T3 is longer than the first predetermined period of time T1, it is possible to prioritize the manual selection using the user interface 25 over the automatic selection based on wireless signals Q1 from transmitters 33, whereas, when the first predetermined period of time T1 is longer than the third predetermined period of time T3, it is possible to prioritize the automatic selection over the manual selection.

(Item 17) The working vehicle 1 according to any one of items 5 to 16, further including a machine body 2 to support the linkage 16, a position detector 66 to detect a position of the machine body 2 and/or the linkage 16, and an input N to receive input of a plurality of positions of a plurality of the attachments 30, wherein the first condition and the second condition each include a condition in which the piece of identification information to be selected by the controller 21 is a piece of identification information corresponding to a certain attachment 30, a distance-for-determination between the position detected by the position detector 66 and a position of the certain attachment 30 received via the input N being less than or equal to a predetermined distance.

With the working vehicle 1 according to item 17, since the controller 21 selects a piece of identification information based on the positional relationship between the attachment 30 and the machine body 2 and/or the linkage 16, it is possible to improve the accuracy of identifying the attachment 30.

(Item 18) The working vehicle 1 according to item 17, wherein the predetermined distance based on which the piece of identification information is to be selected by the controller 21 is smaller in the second condition than in the first condition.

With the working vehicle 1 according to item 18, it is possible to select an attachment 30 relatively close to the receiver 23 in the second selecting process as compared to the first selecting process. Therefore, it is possible to achieve the accuracy of identifying the attachment 30 in the second selecting process after the attachment 30 is attached to the linkage 16, i.e., when at least the receiver 23 and the attachment 30 are highly likely to be closest to each other.

(Item 19) The working vehicle 1 according to any one of items 1 to 18, wherein the linkage 16 includes a hitch selectively operable in a first mode in which the attachment 30 is allowed to be attached and detached or a second mode in which the attachment 30 is restricted from being attached and detached, and the controller 21 is configured or programmed to perform the first selecting process or the second selecting process when the hitch is switched from the first mode to the second mode to attach the attachment 30 thereto.

With the working vehicle 1 according to item 19, the controller 21 is able to reliably recognize the mounting of the attachment 30 based on the mode of the hitch.

(Item 20) The working vehicle 1 according to item 19, further including an operation actuator 26, 27 to be operated to switch the hitch between the first mode and the second mode, wherein the controller 21 is configured or programmed to determine whether the hitch has been switched from the first mode to the second mode and the attachment 30 is attached to the hitch based on an operation state of the operation actuator 26, 27, and perform the first selecting process or the second selecting process.

With the working vehicle 1 according to item 20, the controller 21 is able to reliably and easily recognize the mounting of the attachment 30 based on the mode of the hitch.

(Item 21) The working vehicle 1 according to item 19 or 20, wherein the controller 21 is configured or programmed to, when the hitch is switched from the first mode to the second mode to attach the attachment 30 thereto, determine whether the memory and/or storage 21*a* stores any piece of identification information satisfying the first condition, and perform the first selecting process if the memory and/or storage 21*a* stores one or more pieces of identification information satisfying the first condition, and perform the second selecting process instead of the first selecting process if the memory and/or storage 21*a* stores no identification information satisfying the first condition.

With the working vehicle 1 according to item 21, the controller 21 performs a first selecting process or a second selecting process based on the point in time at which the modes of the hitch are switched. This makes it possible for the working vehicle 1 to more smoothly select a piece of identification information and perform a predetermined process.

(Item 22) An attachment usage system 100 including a linkage 16 provided on a working vehicle 1 to attach and detach an attachment 30 thereto and therefrom, one or more transmitters 33 provided in or on one or more of the attachments 30 to periodically transmit one or more wireless signals Q1 which include respective one or more pieces of identification information of the one or more attachments 30 and which are compliant with a near field communication standard, a receiver 23 provided on the working vehicle 1 to receive the one or more wireless signals Q1 transmitted from the one or more transmitters 33, and a controller 21 configured or programmed to select a piece of identification information of the attachment 30 attached to the linkage 16 from the one or more pieces of identification information included in the one or more wireless signals Q1 received by the receiver 23, and start a predetermined process based on the selected piece of identification information, wherein the controller 21 is configured or programmed to cause a memory and/or storage 21*a* to store, for a first predetermined period of time T1, the one or more pieces of identification information included in the one or more wireless signals Q1 received by the receiver 23, and when the attachment 30 is attached to the linkage 16, perform a first selecting process to select a piece of identification information satisfying a first condition from the one or more pieces of identification information stored in the memory and/or storage 21*a*, and, if the memory and/or storage 21*a* stores no identification information satisfying the first condition, perform a second selecting process to select a piece of identification information satisfying a second condition from one or more pieces of identification information included in one or more wireless signals Q1 received by the receiver 23 after the attachment 30 is attached to the linkage 16.

With the attachment usage system 100 according to item 22, the controller 21 is configured or programmed to, upon each receipt by the receiver 23 of a wireless signal Q1 transmitted one-way from a transmitter 33, cause the memory and/or storage (storing unit) 21*a* to store the piece of identification information included in that wireless signal Q1, and, when an attachment 30 is attached to the linkage 16, select a piece of identification information of the attached attachment 30 from the storing unit 21*a*. Therefore, the controller 21 does not need to perform complex signal processing each time a wireless signal Q1 is received, making it possible to reduce the processing load on the controller 21. On the other hand, even if the storing unit 21*a* stores no identification information satisfying the first condition, a piece of identification information satisfying the second condition newly received by the receiver 23 is selected, making it possible for the working vehicle 1 to smoothly perform the predetermined process. It follows that it is possible to efficiently use replaceable attachments 30 on the working vehicle 1.

(Item 23) A working vehicle 1 including a linkage 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select a piece of identification information of the attachment 30 attached to the linkage 16 from the one or more pieces of identification information included in the one or more wireless signals Q1 received by the receiver 23, and start a predetermined process based on the selected piece of identification information, wherein the controller 21 is configured or programmed to, when the attachment 30 is attached to the linkage 16, perform a first selecting process to select a piece of identification information satisfying a first condition from one or more pieces of identification information included in one or more wireless signals Q1 received by the receiver 23 during a first predetermined period of time T1 which ends when the attachment 30 is attached to the linkage 16, and if there is no identification information satisfying the first condition, perform a second selecting process to select a piece of identification information satisfying a second condition from one or more pieces of identification information included in one or more wireless signals Q1 received by the receiver 23 after the attachment 30 is attached to the linkage 16, and the first condition and the second condition differ from each other in a degree of a selection criterion based on which a piece of identification information is selected.

With the working vehicle 1 according to item 23, even if the receiver 23 has not received identification information satisfying the first condition, a piece of identification information satisfying the second condition newly received by the receiver 23 is selected, making it possible for the working vehicle 1 to smoothly perform a predetermined process. It follows that it is possible to efficiently use replaceable attachments 30 on the working vehicle 1. Furthermore, by adjusting the selection criteria in the first condition and the second condition, it is possible to cause the degree of priority between the accuracy of identifying the attachment 30 and the instant start of a predetermined process in the second selecting process to differ from the first selecting process.

(Item 24) The working vehicle 1 according to item 23, wherein the second condition is stricter than the first condition in the degree of the selection criterion based on which a piece of identification information is selected With the working vehicle 1 according to item 24, it is possible to achieve the accuracy of identifying the attachment 30 in the second selecting process.

(Item 25) The working vehicle 1 according to item 24, wherein the first condition and the second condition each include a condition in which the piece of identification information to be selected by the controller 21 is a piece of identification information included in a wireless signal Q1 with a received signal strength greater than a predetermined value.

With the working vehicle 1 according to item 25, since it can be said that a higher received signal strength indicates a shorter distance between the transmitter 33 and the receiver 23 than when the received signal strength is lower, it is possible to improve the accuracy of identifying the attachment 30.

(Item 26) The working vehicle 1 according to item 25, wherein the second condition includes a condition in which the piece of identification information to be selected by the controller 21 is a piece of identification information included in a wireless signal Q1 with a received signal strength greater compared to the first condition.

With the working vehicle 1 according to item 26, it is possible to select an attachment 30 relatively close to the receiver 23 in the second selecting process as compared to the first selecting process. Thus, after an attachment 30 is attached to the linkage 16, i.e., at least in the second selecting process in which the receiver 23 and the attachment 30 are highly likely to be closest to each other, it is possible to achieve the accuracy of identifying the attachment 30.

(Item 27) An attachment usage system 100 including a linkage 16 provided on a working vehicle 1 to attach and detach an attachment 30 thereto and therefrom, one or more transmitters 33 provided in or on one or more of the attachments 30 to periodically transmit one or more wireless signals Q1 which include respective one or more pieces of identification information of the one or more attachments 30 and which are compliant with a near field communication standard, a receiver 23 provided on the working vehicle 1 to receive the one or more wireless signals Q1 transmitted from the one or more transmitters 33, and a controller 21 configured or programmed to select a piece of identification information of the attachment 30 attached to the linkage 16 from the one or more pieces of identification information included in the one or more wireless signals Q1 received by the receiver 23, and start a predetermined process based on the selected piece of identification information, wherein the controller 21 is configured or programmed to, when the attachment 30 is attached to the linkage 16, perform a first selecting process to select a piece of identification information satisfying a first condition from one or more pieces of identification information included in one or more wireless signals Q1 received by the receiver 23 during a first predetermined period of time T1 which ends when the attachment 30 is attached to the linkage 16, and if there is no identification information satisfying the first condition, perform a second selecting process to select a piece of identification information satisfying a second condition from one or more pieces of identification information included in one or more wireless signals Q1 received by the receiver 23 after the attachment 30 is attached to the linkage 16, and the first condition and the second condition differ from each other in a degree of a selection criterion based on which a piece of identification information is selected.

With the attachment usage system 100 according to item 27, even if the receiver 23 has not received identification information satisfying the first condition, a piece of identification information satisfying the second condition newly received by the receiver 23 is selected, making it possible for the working vehicle 1 to smoothly perform a predetermined process. It follows that it is possible to efficiently use replaceable attachments 30 on the working vehicle 1. Furthermore, by adjusting the selection criteria in the first condition and the second condition, it is possible to cause the degree of priority between the accuracy of identifying the attachment 30 and the instant start of a predetermined process in the second selecting process to differ from the first selecting process.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a linkage to attach and detach an attachment thereto and therefrom;

a receiver to receive one or more wireless signals which are transmitted periodically from one or more transmitters in or on one or more of the attachments, which include respective one or more pieces of identification information of the one or more attachments, and which are compliant with a near field communication standard; and a controller configured or programmed to:

select a piece of identification information of the attachment attached to the linkage from the one or more pieces of identification information included in the one or more wireless signals received by the receiver; and start a predetermined process based on the selected piece of identification information; wherein the controller is configured or programmed to:

cause a memory and/or storage to store, for a first predetermined period of time, the one or more pieces of identification information included in the one or more wireless signals received by the receiver; and when the attachment is attached to the linkage, perform a first selecting process to select a piece of identification information satisfying a first condition from the one or more pieces of identification information stored in the memory and/or storage, and, if the memory and/or storage stores no identification information satisfying the first condition, perform a second selecting process to select a piece of identification information satisfying a second condition from one or more pieces of identification information included in one or more wireless signals received by the receiver after the attachment is attached to the linkage.

2. The working vehicle according to claim 1, wherein the controller is configured or programmed to, in the second selecting process, if the receiver receives a wireless signal including a piece of identification information satisfying the second condition, select the piece of identification information included in the wireless signal.

3. The working vehicle according to claim 2, wherein the controller is configured or programmed to:

cause the memory and/or storage to store, for the first predetermined period of time, one or more received signal strengths of the one or more wireless signals received by the receiver such that the one or more received signal strengths are associated with the one or more pieces of identification information included in the one or more wireless signals; and in the first selecting process, select, from the one or more pieces of identification information stored in the memory and/or storage, a piece of identification information which satisfies the first condition and which is included in a wireless signal with a highest received signal strength.

4. The working vehicle according to claim 1, wherein the first condition and the second condition differ from each other in a degree of a selection criterion based on which a piece of identification information is selected.

5. The working vehicle according to claim 4, wherein the second condition is stricter than the first condition in the degree of the selection criterion based on which a piece of identification information is selected.

6. The working vehicle according to claim 5, wherein the first condition and the second condition each include a condition in which the piece of identification information to be selected by the controller is a piece of identification information included in a wireless signal with a received signal strength greater than a predetermined value.

7. The working vehicle according to claim 6, wherein the second condition includes a condition in which the piece of identification information to be selected by the controller is a piece of identification information included in a wireless signal with a received signal strength greater compared to the first condition.

8. The working vehicle according to claim 7, further comprising:

a machine body to support the linkage; and a traveling device to support the machine body such that the machine body is allowed to travel.

9. The working vehicle according to claim 5, wherein at least the second condition of the first and second conditions includes a condition in which the piece of identification information to be selected by the controller is a piece of identification information corresponding to a wireless signal which includes vibration information indicating that a corresponding attachment is vibrating.

10. The working vehicle according to claim 9, wherein the controller is configured or programmed to, based on the vibration information, acquire a value-for-determination indicating at least one of a vibration strength of the corresponding attachment, a frequency of vibration occurrence of the corresponding attachment, or a vibration duration of the corresponding attachment; and the second condition includes a condition in which the piece of identification information to be selected by the controller is a piece of identification information included in a wireless signal with a value-for-determination greater compared to the first condition.

11. The working vehicle according to claim 10, further comprising:

a machine body to support the linkage; and a driver on the machine body to be driven; wherein the driver includes at least one of:

a position changer to connect the linkage and the machine body and to be driven to change a position of the linkage relative to the machine body; or a traveling device to support the machine body and to be driven to impart a propelling force to the machine body.

12. The working vehicle according to claim 11, wherein the controller is configured or programmed to, in the second selecting process, select a piece of identification information satisfying the second condition from one or more pieces of identification information included in one or more wireless signals received by the receiver after the attachment is attached to the linkage and after the driver starts to be driven.

13. The working vehicle according to claim 12, wherein the controller is configured or programmed to, in the second selecting process, select a piece of identification information satisfying the second condition from one or more pieces of identification information included in one or more wireless signals received by the receiver during a second predetermined period of time after the attachment is attached to the linkage and after the driver starts to be driven.

14. The working vehicle according to claim 5, further comprising:

a machine body to support the linkage; and a vibration detector provided in or on the machine body to detect vibration of the machine body; wherein at least the second condition of the first and second conditions includes a condition in which the piece of identification information to be selected by the controller is a piece of identification information corresponding to a wireless signal including vibration information indicating that there is vibration on a corresponding attachment, the vibration on the corresponding attachment relatively matching the vibration of the machine body detected by the vibration detector.

15. The working vehicle according to claim 1, wherein the controller is configured or programmed to:

end the second selecting process if, in the second selecting process, the second condition is satisfied by none of one or more pieces of identification information included in one or more wireless signals received by the receiver during a third predetermined period of time starting when the attachment is attached to the linkage; and allow a user interface to receive input of information indicating the attachment attached to the linkage, and start the predetermined process based on the information received via the user interface.

16. The working vehicle according to claim 15, wherein the third predetermined period of time differs in duration from the first predetermined period of time.

17. The working vehicle according to claim 5, further comprising:

a machine body to support the linkage;

a position detector to detect a position of the machine body and/or the linkage; and an input to receive input of a plurality of positions of a plurality of the attachments; wherein the first condition and the second condition each include a condition in which the piece of identification information to be selected by the controller is a piece of identification information corresponding to a certain attachment, a distance-for-determination between the position detected by the position detector and a position of the certain attachment received via the input being less than or equal to a predetermined distance.

18. The working vehicle according to claim 17, wherein the predetermined distance based on which the piece of identification information is to be selected by the controller is smaller in the second condition than in the first condition.

19. The working vehicle according to claim 1, wherein the linkage includes a hitch selectively operable in a first mode in which the attachment is allowed to be attached and detached or a second mode in which the attachment is restricted from being attached and detached; and the controller is configured or programmed to perform the first selecting process or the second selecting process when the hitch is switched from the first mode to the second mode to attach the attachment thereto.

20. The working vehicle according to claim 19, further comprising an operation actuator to be operated to switch the hitch between the first mode and the second mode; wherein the controller is configured or programmed to determine whether the hitch has been switched from the first mode to the second mode and the attachment is attached to the hitch based on an operation state of the operation actuator, and perform the first selecting process or the second selecting process.

21. The working vehicle according to claim 19, wherein the controller is configured or programmed to:

when the hitch is switched from the first mode to the second mode to attach the attachment thereto, determine whether the memory and/or storage stores any piece of identification information satisfying the first condition; and perform the first selecting process if the memory and/or storage stores one or more pieces of identification information satisfying the first condition, and perform the second selecting process instead of the first selecting process if the memory and/or storage stores no identification information satisfying the first condition.

22. An attachment usage system comprising:

a linkage provided on a working vehicle to attach and detach an attachment thereto and therefrom;

one or more transmitters provided in or on one or more of the attachments to periodically transmit one or more wireless signals which include respective one or more pieces of identification information of the one or more attachments and which are compliant with a near field communication standard;

a receiver provided on the working vehicle to receive the one or more wireless signals transmitted from the one or more transmitters; and a controller configured or programmed to:

select a piece of identification information of the attachment attached to the linkage from the one or more pieces of identification information included in the one or more wireless signals received by the receiver; and start a predetermined process based on the selected piece of identification information; wherein the controller is configured or programmed to:

cause a memory and/or storage to store, for a first predetermined period of time, the one or more pieces of identification information included in the one or more wireless signals received by the receiver; and when the attachment is attached to the linkage, perform a first selecting process to select a piece of identification information satisfying a first condition from the one or more pieces of identification information stored in the memory and/or storage, and, if the memory and/or storage stores no identification information satisfying the first condition, perform a second selecting process to select a piece of identification information satisfying a second condition from one or more pieces of identification information included in one or more wireless signals received by the receiver after the attachment is attached to the linkage.

23. A working vehicle comprising:

a linkage to attach and detach an attachment thereto and therefrom;

a receiver to receive one or more wireless signals which are transmitted periodically from one or more transmitters in or on one or more of the attachments, which include respective one or more pieces of identification information of the one or more attachments, and which are compliant with a near field communication standard; and a controller configured or programmed to:

select a piece of identification information of the attachment attached to the linkage from the one or more pieces of identification information included in the one or more wireless signals received by the receiver; and start a predetermined process based on the selected piece of identification information; wherein the controller is configured or programmed to, when the attachment is attached to the linkage:

perform a first selecting process to select a piece of identification information satisfying a first condition from one or more pieces of identification information included in one or more wireless signals received by the receiver during a first predetermined period of time which ends when the attachment is attached to the linkage; and if there is no identification information satisfying the first condition, perform a second selecting process to select a piece of identification information satisfying a second condition from one or more pieces of identification information included in one or more wireless signals received by the receiver after the attachment is attached to the linkage; and the first condition and the second condition differ from each other in a degree of a selection criterion based on which a piece of identification information is selected.

24. The working vehicle according to claim 23, wherein the second condition is stricter than the first condition in the degree of the selection criterion based on which a piece of identification information is selected.

25. The working vehicle according to claim 24, wherein the first condition and the second condition each include a condition in which the piece of identification information to be selected by the controller is a piece of identification information included in a wireless signal with a received signal strength greater than a predetermined value.

26. The working vehicle according to claim 25, wherein the second condition includes a condition in which the piece of identification information to be selected by the controller is a piece of identification information included in a wireless signal with a received signal strength greater compared to the first condition.

27. An attachment usage system comprising:

a linkage provided on a working vehicle to attach and detach an attachment thereto and therefrom;

one or more transmitters provided in or on one or more of the attachments to periodically transmit one or more wireless signals which include respective one or more pieces of identification information of the one or more attachments and which are compliant with a near field communication standard;

a receiver provided on the working vehicle to receive the one or more wireless signals transmitted from the one or more transmitters; and a controller configured or programmed to:

select a piece of identification information of the attachment attached to the linkage from the one or more pieces of identification information included in the one or more wireless signals received by the receiver; and start a predetermined process based on the selected piece of identification information; wherein the controller is configured or programmed to, when the attachment is attached to the linkage:

perform a first selecting process to select a piece of identification information satisfying a first condition from one or more pieces of identification information included in one or more wireless signals received by the receiver during a first predetermined period of time which ends when the attachment is attached to the linkage; and if there is no identification information satisfying the first condition, perform a second selecting process to select a piece of identification information satisfying a second condition from one or more pieces of identification information included in one or more wireless signals received by the receiver after the attachment is attached to the linkage; and the first condition and the second condition differ from each other in a degree of a selection criterion based on which a piece of identification information is selected.

* * * * *